United States Patent
Park et al.

(10) Patent No.: US 9,355,027 B2
(45) Date of Patent: May 31, 2016

(54) ZONE-BASED DEFRAGMENTATION METHODS AND USER DEVICES USING THE SAME

(71) Applicant: Samsung Electronics Co., Ltd., Suwon-Si, Gyeonggi-Do (KR)

(72) Inventors: Hyunchul Park, Ansan-si (KR); Sangmok Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 203 days.

(21) Appl. No.: 14/152,333

(22) Filed: Jan. 10, 2014

(65) Prior Publication Data

US 2014/0223083 A1 Aug. 7, 2014

(30) Foreign Application Priority Data

Feb. 4, 2013 (KR) .................. 10-2013-0012520

(51) Int. Cl.
*G06F 12/00* (2006.01)
*G06F 12/02* (2006.01)

(52) U.S. Cl.
CPC .... *G06F 12/0246* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 5,778,392 A | * | 7/1998 | Stockman | G06F 3/0601 |
| 6,038,636 A | * | 3/2000 | Brown, III | G06F 12/0246 |
| | | | | 711/103 |
| 6,735,678 B2 | | 5/2004 | Noble et al. | |
| 7,401,174 B2 | | 7/2008 | So et al. | |
| 7,529,124 B2 | | 5/2009 | Cho et al. | |
| 7,721,059 B2 | | 5/2010 | Mylly et al. | |
| 7,877,569 B2 | | 1/2011 | Honda | |
| 8,140,740 B2 | | 3/2012 | Russo et al. | |
| 8,190,811 B2 | | 5/2012 | Moon et al. | |
| 2001/0047451 A1 | | 11/2001 | Noble et al. | |
| 2004/0169238 A1 | | 9/2004 | Lee et al. | |
| 2005/0231765 A1 | | 10/2005 | So et al. | |
| 2006/0180851 A1 | | 8/2006 | Lee et al. | |
| 2007/0136555 A1 | * | 6/2007 | Sinclair | G06F 3/0605 |
| | | | | 711/203 |
| 2008/0010395 A1 | | 1/2008 | Mylly et al. | |
| 2008/0109589 A1 | | 5/2008 | Honda | |
| 2008/0155175 A1 | | 6/2008 | Sinclair et al. | |
| 2009/0055450 A1 | * | 2/2009 | Biller | G06F 17/30135 |
| 2010/0185806 A1 | | 7/2010 | Pruthi et al. | |
| 2010/0312983 A1 | | 12/2010 | Moon et al. | |
| 2010/0318726 A1 | | 12/2010 | Watanabe | |
| 2011/0099326 A1 | | 4/2011 | Jung et al. | |

(Continued)

FOREIGN PATENT DOCUMENTS

| | | |
|---|---|---|
| JP | 2010-170328 A | 8/2010 |
| KR | 10-0673020 B1 | 1/2007 |

*Primary Examiner* — Kaushikkumar Patel
(74) *Attorney, Agent, or Firm* — Harness, Dickey & Pierce, P.L.C.

(57) ABSTRACT

A defragmentation method of a user device which includes a host and a nonvolatile storage device includes: determining whether fragments of a first file stored at the nonvolatile storage device are in a same logical address zone; and executing defragmentation on the fragments of the first file if the fragments of the first file are in different logical address zones by moving the fragments of the first file to a logical address space corresponding to at least one of the different logical address zones.

20 Claims, 37 Drawing Sheets

(56) References Cited

U.S. PATENT DOCUMENTS

| | | |
|---|---|---|
| 2011/0107011 A1 | 5/2011 | Russo et al. |
| 2011/0238899 A1 | 9/2011 | Yano et al. |
| 2011/0314204 A1 | 12/2011 | Ootsuka et al. |
| 2012/0079229 A1* | 3/2012 | Jensen .................. G06F 3/061 711/170 |
| 2014/0019706 A1* | 1/2014 | Kanfi ....................... G06F 9/00 711/171 |
| 2014/0173178 A1* | 6/2014 | Schwartz ............ G06F 12/0246 711/103 |
| 2014/0215125 A1* | 7/2014 | Sela .................... G06F 12/0246 711/103 |
| 2014/0229657 A1* | 8/2014 | Karamov ............ G06F 12/0246 711/103 |

* cited by examiner

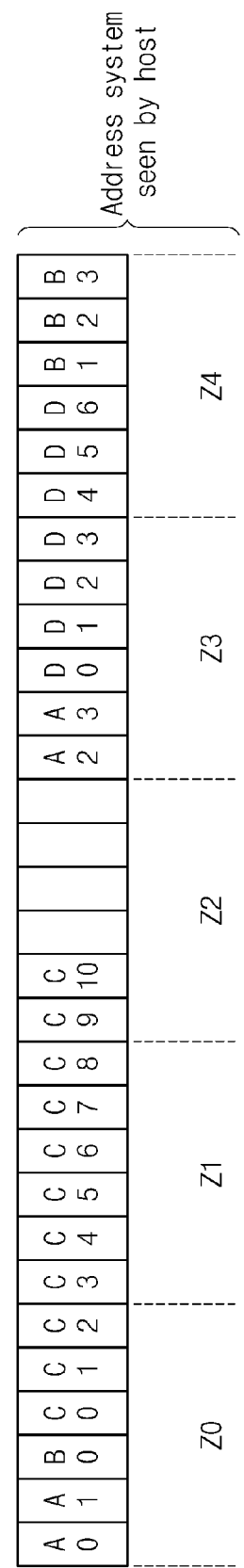

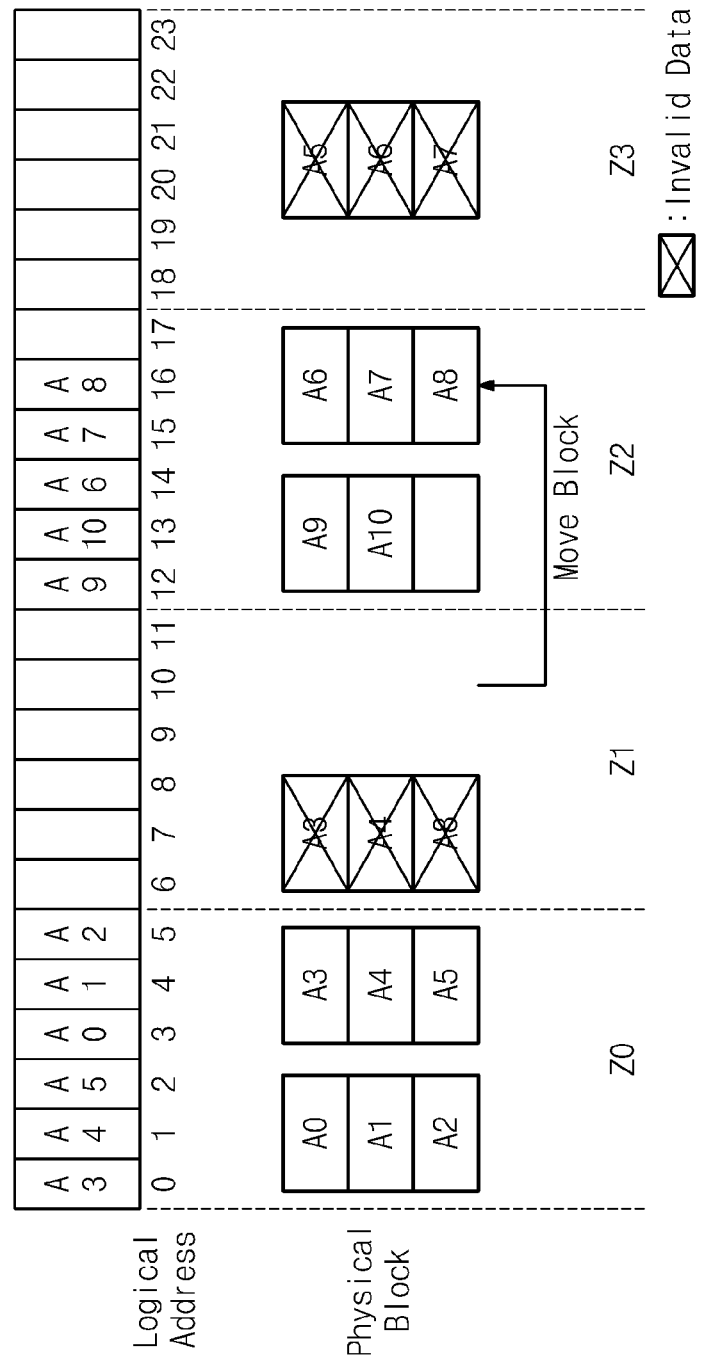

ZONE-BASED DEFRAGMENTATION METHODS AND USER DEVICES USING THE SAME

CROSS-REFERENCE TO RELATED APPLICATIONS

This non-provisional application claims priority under 35 U.S.C. §119 to Korean Patent Application No. 10-2013-0012520 filed Feb. 4, 2013, in the Korean Intellectual Property Office, the entire contents of which are hereby incorporated by reference.

BACKGROUND

1. Field

Example embodiments of inventive concepts described herein relate to user devices supporting defragmentation and/or zone-based defragmentation methods thereof.

2. Description of Conventional Art

Unlike a hard disk, a flash memory may not support an overwrite operation. For this reason, an erase operation may be performed before a write operation. The flash memory may perform an erase operation by a block unit, and a time taken to perform the erase operation may be long. The flash memory characteristics may make it difficult to apply a file system for hard disk to the flash memory without modification. To solve such problems, a flash translation layer FTL may be used as middleware between the file system for hard disk and the flash memory. The FTL may enable the flash memory to be freely read and written like a conventional hard disk.

Defragmentation or defrag may mean a work of reducing the amount of fragmented files of a file system on a hard disk. The defragmentation may be made to speed up by reorganizing, concatenating and/or compacting fragmented files within a hard disk physically. Periodic defragmentation may help maintain the optimal performance of memory systems and constituent data media by reducing the file system overhead and data search time caused by excessive fragmentation.

SUMMARY

According to example embodiments of inventive concepts there is provided a defragmentation method of a user device including a host and a nonvolatile storage device, the method including: determining whether fragments of a first file stored at the nonvolatile storage device are in a same logical address zone; and executing defragmentation on the fragments of the first file if the fragments of the first file are in different logical address zones by moving the fragments of the first file to a logical address space corresponding to at least one of the different logical address zones.

According to example embodiments, the method may further include: skipping defragmentation on the fragments of the first file when the fragments of the first file are in the same logical address zone.

The executing defragmentation on the fragments of the first file may include at least one of: sending read and write commands for each of the fragments of the first file from the host to the nonvolatile storage device; and sending a series of defrag commands from the host to the nonvolatile storage device.

Each of the defrag commands may use a read/write command including defragmentation and end of defragmentation information.

The executing defragmentation may further include: classifying the series of defrag commands according to logical address zone; and moving the fragments of the first file to logical address spaces corresponding to logical address zones based on the classified series of defrag commands.

A physical block storing invalid data generated during the executing of defragmentation on the fragments of the first file may be set to an invalid block without additional information from the host.

According to example embodiments, the method may further include: determining whether rearrangement of fragments of the defragmented file is required after defragmentation on the fragments of the first file is completed; and rearranging the fragments of the defragmented file if rearrangement of the fragments of the defragmented file is required.

The rearranging the fragments of the defragmented file may include: issuing, by the host to the nonvolatile storage device, an LBA (logical block addressing) command including source and destination addresses for fragments to be rearranged; and changing mapping information of the defragmented file without physical movement of the fragments of the defragmented file.

According to example embodiments, there is provided a user device including: a host including a defragmentation program; and a memory controller configured to control a storage medium in response to a request of the host. A logical address space managed by the host is divided into a plurality of logical address zones. The host is configured to skip defragmentation of a fragmented file stored at a same logical address zone and to perform defragmentation on a fragmented file stored at different logical address zones.

The host may be further configured to send read and write commands for each fragment of the fragmented file to the memory controller for defragmentation of the fragments of the fragmented file.

The host may be further configured to send a series of defrag commands to the memory controller for performing defragmentation of fragments of the fragmented file. Each of the defrag command may use a read/write command including defragmentation and end of defragmentation information.

The memory controller may be configured to classify the series of defrag commands according to logical address zone, and to move fragments of the file to logical address spaces corresponding to logical address zones based on the classified series of defrag commands.

The host may be further configured to: determine whether rearrangement of fragments of a defragmented file is required after defragmentation of the fragments of the fragmented file is completed; and issue, to the memory controller, an LBA command including source and destination addresses for fragments to be rearranged if rearrangement of the fragments of the defragmented file is required. The memory controller is configured to rearrange the fragments of the defragmented file by changing mapping information of the defragmented file without a physical movement of the fragments of the defragmented file.

According to example embodiments, there is provided a user device including: a host configured to selectively defragment a fragmented file stored in a physical address space of a storage medium based on whether fragments of the fragmented file are associated with a same logical address zone in a logical address space corresponding to the physical address space. The logical address space includes a plurality of logical address zones, and each of the plurality of logical address zones includes a plurality of continuous logical addresses The host may be further configured to skip defragmentation of the fragmented file if fragments of the fragmented file are associated with the same logical address zone.

The host may be further configured to defragment the fragmented file by moving the fragments of the fragmented file such that the fragments of the fragmented file are associated with only one of the different logical address zones.

The host may be further configured to defragment the fragmented file only if the fragments of fragmented file are associated with different logical address zones.

Fragments of the defragmented file may be associated with the same logical address zone, and the user device may further include a memory controller configured to rearrange the fragments of the defragmented file by changing mapping information of the defragmented file without physical movement of the fragments of the defragmented file in the physical address space of the non-volatile storage medium.

According to example embodiments, there is provided a file defragmentation method for a user device including a host and a non-volatile storage medium, the method including: selectively defragmenting, by the host, a fragmented file stored in a physical address space of the non-volatile storage medium based on whether fragments of the fragmented file are associated with a same logical address zone in a logical address space corresponding to the physical address space, the logical address space including a plurality of logical address zones, and each of the plurality of logical address zones including a plurality of continuous logical addresses.

The selectively defragmenting may include: skipping defragmentation of the fragmented file if fragments of the fragmented file are associated with the same logical address zone.

The selectively defragmenting may include: defragmenting the fragmented file by moving the fragments of the fragmented file such that the fragments of the fragmented file are associated with only one of the different logical address zones.

The selectively defragmenting may include: defragmenting the fragmented file only if the fragments of fragmented file are associated with different logical address zones.

Fragments of the defragmented file may be associated with the same logical address zone, and the method may further include: rearranging the fragments of the defragmented file by changing mapping information of the defragmented file without physical movement of the fragments of the defragmented file in the physical address space of the non-volatile storage medium.

With example embodiments of inventive concepts, it is possible to manage defragmentation faster and/or more efficiently through division management of a logical address space. Also, it is possible to more efficiently process an operation associated with defragmentation through a defragmentation command/LBA command.

BRIEF DESCRIPTION OF THE FIGURES

The above and other objects and features will become apparent from the following description with reference to the following figures, wherein like reference numerals refer to like parts throughout the various figures unless otherwise specified, and wherein

FIGS. 5A to 5H are diagrams schematically illustrating example flows of file fragments at file defragmentation of FIG. 4;

FIGS. 9A to 9G are diagrams schematically illustrating variations of physical blocks at defragmentation of a user device using a defrag command described in FIG. 7;

DETAILED DESCRIPTION

Figure 1:
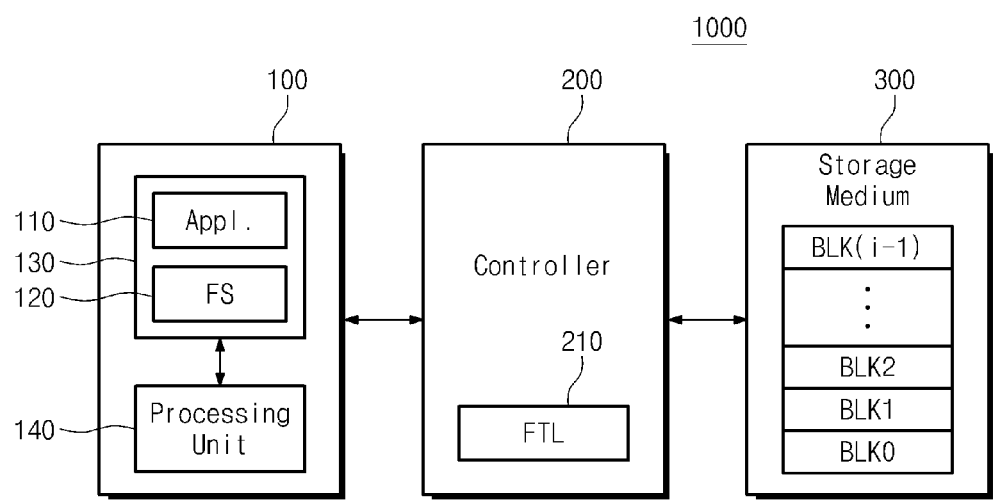
FIG. 1 is a block diagram schematically illustrating a user device according to an example embodiment of inventive concepts.

Example embodiments will be described in detail with reference to the accompanying drawings. Inventive concepts, however, may be embodied in various different forms, and should not be construed as being limited only to the illustrated embodiments. Rather, these embodiments are provided as examples so that this disclosure will be thorough and complete, and will fully convey inventive concepts to those skilled in the art. Accordingly, known processes, elements, and techniques are not described with respect to some of the example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a user device according to an example embodiment of inventive concepts.

Referring to FIG. 1, a user device 1000 may include a host 100, a memory controller 200, and a storage medium 300. The host 100 may be configured to control an overall operation of the user device 1000. The host 100 may include a host memory 130 including an application program 110, a file system 120, etc. and a processing unit 140. For example, the host memory 130 may be a main memory of the host 100. The application program 110 may provide defragmentation for gathering file fragments. As will be more fully described later, the application program 110 may gather file fragments based on a zone (e.g., indicating a set of logical addresses continuously allocated). The file system 120 may be a file and data management system compatible with a legacy file system used to define and manage data and data files stored on the storage medium 300. The file system 120 may manage files on the basis of sectors of hard disk or blocks of flash memory. The processing unit 140 may be configured to control an overall operation of the host 100.

The file system 120 may include flash memory file systems such as LFS, JFFS, YAFFS and LogFS, as well as FAT (File Application Table), NTFS (New Technology File System), HPFS (High Performance File System), UFS (Unix File System), Ext2 (Second Extended File System) and Ext3 (Third Extended File System) that are used mainly in floppy disks or hard disks.

The memory controller 200 may control read, write and erase operations of the storage medium 300 in response to a request (e.g., a write request or a read request) of the host 100. The memory controller 200 may include a flash translation layer (FTL) 210. The flash translation layer 210 may translate a logical address provided from the host 100 into a physical address of the storage medium 300. For example, the flash translation layer 210 may be used to manage mapping relationship between logical addresses and physical addresses. The mapping relationship between logical addresses and physical addresses may be managed using a mapping table. The flash translation layer 210 may cause the operation of the flash storage device 1200 to emulate hard disk compatible operations. That is as seen from the host 100, the storage medium 300 appears to operate just like a hard disk, but actually operates according to performance characteristics unique to flash memory (e.g., the block-based erase, and the erase before write operation requirement) in physical space. The FTL 210 may be stored within the storage medium 300, and may be loaded on an SRAM at power-up.

The storage medium 300 may be used to store user data (e.g., word processor files, moving picture files, picture files, etc.), meta information (e.g., including file names, file sizes, file locations, etc.) managed by the file system 120, and meta information (e.g., mapping tables, program-erase cycles, etc.) managed by the memory controller 200. However, inventive concepts are not limited thereto. For example, the storage medium 300 may be formed of one or more nonvolatile memory devices. The storage medium 300 may be formed of one or more NAND flash memories. However, inventive concepts are not limited thereto. For example, the storage medium 300 may be formed of nonvolatile memory devices such as a NOR flash memory device, a PRAM (phase-change random access memory), an RRAM (resistive random access memory), an FRAM (ferroelectric random access memory), an MRAM (magnetic random access memory), and so on. A data storage space of the storage medium 300 may be formed of a plurality of memory blocks BLK0 to BLKi-1, each of which is formed of a plurality of pages (or, a plurality of sectors).

In example embodiments, the memory controller 200 and the storage medium 300 may constitute a flash memory based storage device (e.g., a memory card), and may be directly mounted on a main board of the user device 1000. Alternatively, the memory controller 200 and the storage medium 300 may constitute a flash memory based storage device (e.g., a memory card), and may be implemented to be detachable from the main board of the user device 1000.

Figure 2:
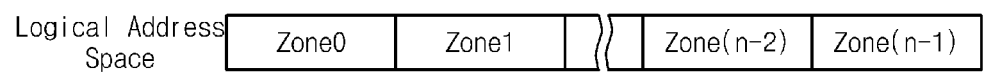
FIG. 2 is a diagram schematically illustrating a logical address space managed by a file system.

FIG. 2 is a diagram schematically illustrating a logical address space managed by a file system.

In a user device according to an example embodiment of inventive concepts, a logical address space managed by a file system may be divided into a plurality of zones. A zone may be defined by continuous logical addresses. A zone size may not be limited to a specific size. A zone size may be variable.

Fragments of files managed by the file system 120 may be defragmented through an application program 110. For example, when a specific condition is satisfied, the application program 110 may execute defragmentation. In example embodiments, the specific condition may include such a condition that defragmentation is requested by a user of the user device 1000. However, inventive concepts are not limited thereto. For example, when the user device 1000 is at an idle state, the application program 110 may determine whether to execute defragmentation based on the amount of fragmented files and execute defragmentation according to the determination result.

In an example embodiment of inventive concepts, defragmentation on fragmented files belonging to the same zone may not be performed. In the event that fragments of a fragmented file exist at different zones, defragmentation on the fragmented file may be completed by moving fragments of the fragmented file to a zone. That is, although fragments of a fragmented file exist at the same zone and the fragments of the fragmented file are discontinuously arranged on the basis of logical addresses, defragmentation on the fragmented file may be completed. If defragmentation on a file is ended, defragmentation on another file may be executed. Defragmentation on another file may be also completed by moving fragments of a fragmented file to a zone. In addition, as occasion demands, file fragments discontinuously arranged can be rearranged continuously on the basis of logical addresses.

In example embodiments, defragmentation executed by the application program 110 may be performed using a read command and a write command. For example, it is assumed that a file is fragmented into three fragments (hereinafter, referred to as first to third fragments). In this case, file defragmentation may be completed by arranging the second and third file fragments continuously with respect to a logical address corresponding to the first file fragment. The second and third file fragments may be arranged continuously with respect to a logical address corresponding to the first file fragment by using read and write commands iteratively.

In example embodiments, a host 100 may acquire zone information of a logical address space using various manners. For example, zone information may be set to the application program 110 in advance. Alternatively, zone information may be provided from a memory controller 200 according to a request of the host 100. Alternatively, zone information managed by the memory controller 200 may be acquired using an iterative read request. However, inventive concepts are not limited thereto.

Figure 3:
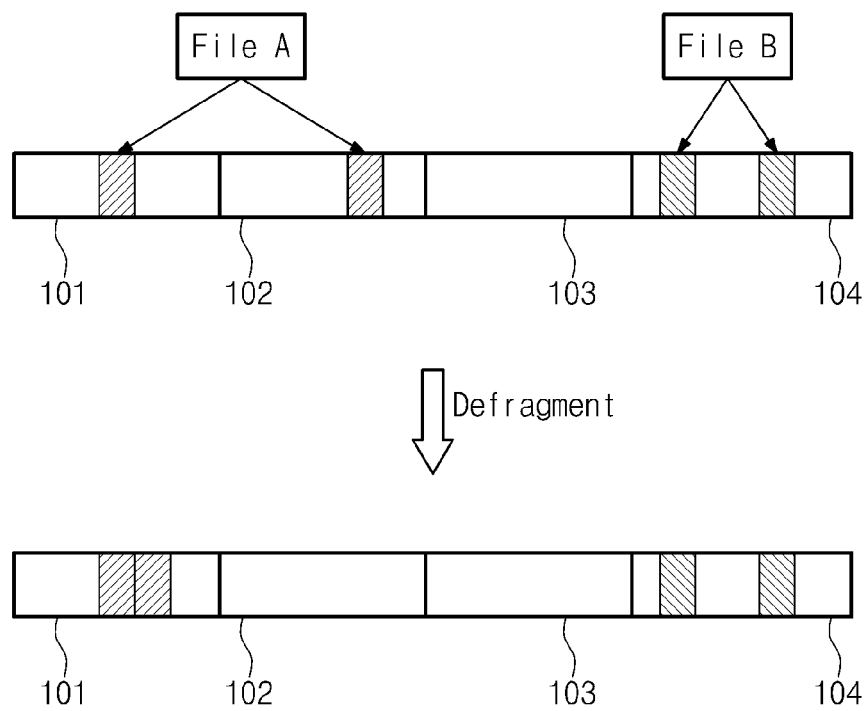
FIG. 3 is a diagram schematically illustrating file defragmentation according to an example embodiment of inventive concepts.

FIG. 3 is a diagram schematically illustrating file defragmentation according to an example embodiment of inventive concepts. In FIG. 3, it is assumed that a logical address space managed by a file system 120 is divided into four zones 101 to 104 (hereinafter, referred to as first to fourth zones). Also, it is assumed that fragments of a file A are stored at logical address spaces respectively corresponding to first and second zones 101 and 102 and fragments of a file B may be stored at a logical address space corresponding to the fourth zone 104.

If defragmentation is executed, an application program 110 may move fragments of the fragmented file A to one (e.g., 101) of different zones (e.g., the first and second zones 101 and 102) because fragments of the fragmented file A exist at the first and second zones 101 and 102. On the other hand, since fragments of the fragmented file B exist at the same zone (e.g., the fourth zone 104), defragmentation on the fragmented file B may not be performed. In some cases, the application program 110 may rearrange fragments of the fragmented file B so as to be continuously disposed.

Figure 4:
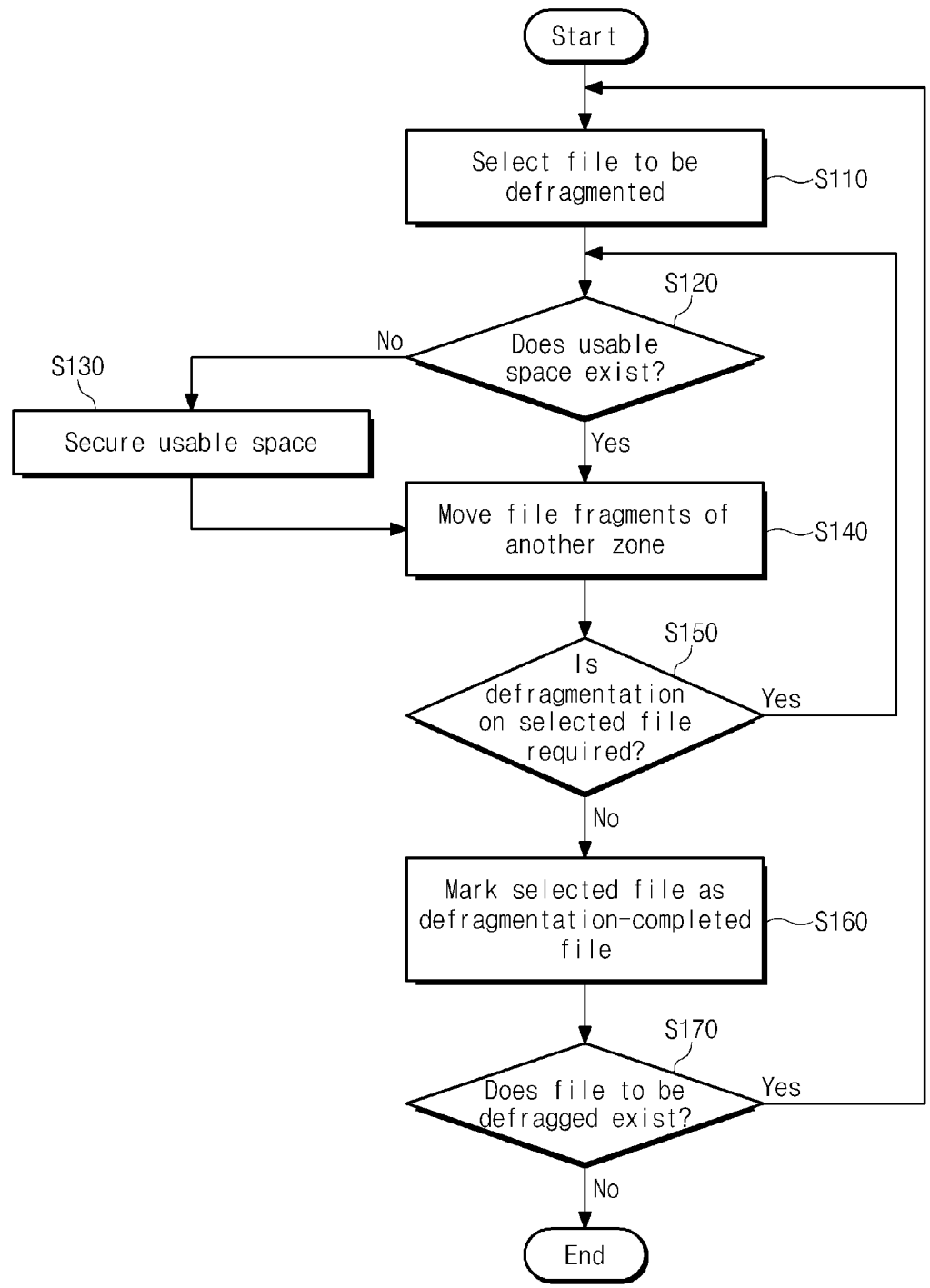
FIG. 4 is a flow chart schematically illustrating file defragmentation of a user device according to an example embodiment of inventive concepts.

FIG. 4 is a flow chart schematically illustrating file defragmentation of a user device according to an example embodiment of inventive concepts. FIGS. 5A to 5H are diagrams schematically illustrating flows of file fragments at file defragmentation of FIG. 4. Below, file defragmentation of a user device according to an example embodiment of inventive concepts will be more fully described with reference to accompanying drawings.

With file defragmentation of an example embodiment of inventive concepts, fragments of a fragmented file may be moved to the same zone. At this time, sequential disposition of fragments may not be considered. In some case, sequential disposition of fragments may be made later. For ease of description, it is assumed that a logical address space is formed of five zones Z0 to Z4 (refer to FIG. 5A) and four files A, B, C, and D are stored at a logical address space. For example, as illustrated in FIG. 5A, fragments A0 to A3 of a file A may be stored at logical address areas of first and fourth zones Z0 and Z3, fragments B0 to B3 of a file A may be stored at logical address areas of first and fifth zones Z0 and Z5, fragments C0 to C10 of a file C may be stored at logical address areas of second and third zones Z1 and Z2, and fragments D0 to D4 of a file D may be stored at logical address areas of fourth and fifth zones Z3 and Z4. This address system may be seen by a host 100.

If a specific condition of file defragmentation is satisfied, an application program 110 for file defragmentation may be executed. The specific condition of file defragmentation may include a request of a user, for example. Once the application program 110 for file defragmentation is executed, in operation S110, it may select a file to be defragmented. For ease of description, it is assumed that there is selected a fragmented file, having a smallest logical address value, from among fragmented files within the logical address space. However, inventive concepts are not limited thereto. A fragmented file may be selected on the basis of a file size, the number of zones where a fragmented file is stored, etc. regardless of a logical address value. In example embodiments, in operation S110, the application program 110 may select a file A. As described above, fragments A0 to A3 of a file A may be stored at logical address areas of first and fourth zones Z0 and Z3.

Figure 5B:
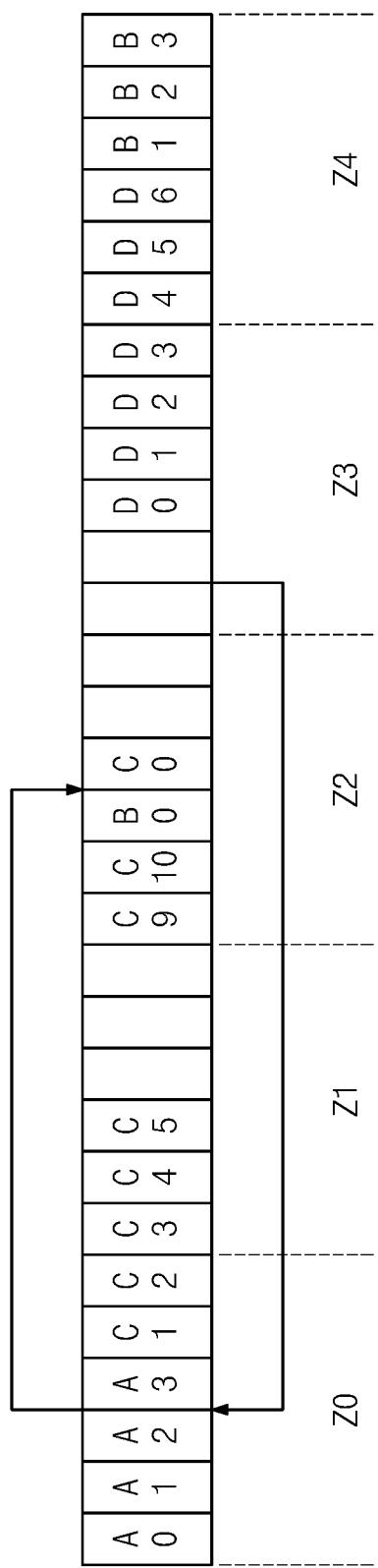

In operation S120, the application program 110 may determine whether a usable/free space exists at a zone to which the selected file A is to be moved. If a usable/free space does not exist at a zone to which the selected file A is to be moved, the method may proceed to operation S130. In operation S130, there may be secured a usable space of one of zones at which a file to be defragmented is stored. Referring to FIG. 5B, since the number of fragments A2 and A3 of the file A to be moved to the first zone Z0 is 2, it is necessary to secure a usable space of the first zone Z0 to which two fragments are to be stored. In this case, a usable space of the first zone Z0 to which the fragmented file is to be stored may be secured by moving a fragment B0 of a file B and a fragment C0 of a file C in the first zone Z0 to a free space of a third zone Z2. Once a usable space is secured, the method may proceed to operation S140.

In example embodiments, the fragment B0 of the file B and the fragment C0 of the file C in the first zone Z0 may be moved to a free space of the third zone Z2 through a read command and a write command. For example, a host 100 may request a read operation at a memory controller 200 such that a file fragment B0 is read from a physical space of a storage medium 300 corresponding to a logical address of the file fragment B0. Then, the host 100 may request a write operation at the memory controller 200 such that the read file fragment B0 is stored at a physical space of the storage medium 300 corresponding to a logical address of the third zone Z2. Likewise, the host 100 may request a read operation at the memory controller 200 such that a file fragment C0 is read from a physical space of the storage medium 300 corresponding to a logical address of the file fragment C0. Then, the host 100 may request a write operation at the memory controller 200 such that the read file fragment C0 is stored at a physical space of the storage medium 300 corresponding to a logical address of the third zone Z2. Thus, the fragments B0 and C0 in the first zone Z0 may be moved to a free space of the third zone Z2 through execution of read and write commands. Mapping relationship between logical addresses and physical addresses may be changed at execution of the write operations. An invalid physical space may be generated by updating the mapping relationship. The invalid physical space may be allocated to a free space through garbage collection to be performed later.

Returning to operation S120, if a usable/free space exists at a zone to which the selected file A is to be moved, the method may proceed to operation S140. In operation S140, the application program 110 may move fragments A2 and A3 of the file A existing at another zone (e.g., a fourth zone Z3) to the first zone A0. The fragments A2 and A3 of the file A existing at the fourth zone Z3 may be moved to the first zone A0 through the above-described read and write commands. Likewise, mapping relationship between logical addresses and physical addresses may be changed at execution of write operations.

In operation S150, the application program 110 may determine whether defragmentation on the selected file is additionally required. Since the fragments A0 to A3 of the file A stored at the first and third zones Z0 and Z2 are moved to the first zone Z0, defragmentation on the selected file may not be additionally required. In this case, the method may proceed to operation S160. If fragments of the file A exist at another zone, the method may proceed to operation S110. The above-described operations S110 to S150 may be repeated until all fragments of the selected file A are moved to the same zone.

In operation S160, the selected file A may be marked as a defragmentation-completed file. This may be made by the application program 110.

In operation S170, the application program 110 may determine whether a file to be defragmented exists. If a file to be defragmented does not exist, the method may be ended. On the other hand, if a file to be defragmented exists, the method may proceed to operation S110.

Below, defragmentation on the remaining files B, C and D will be described. Defragmentation on the remaining files B, C and D may be performed through the above-described operations S110 to S170.

First, defragmentation on the file C may be executed.

Figure 5C:
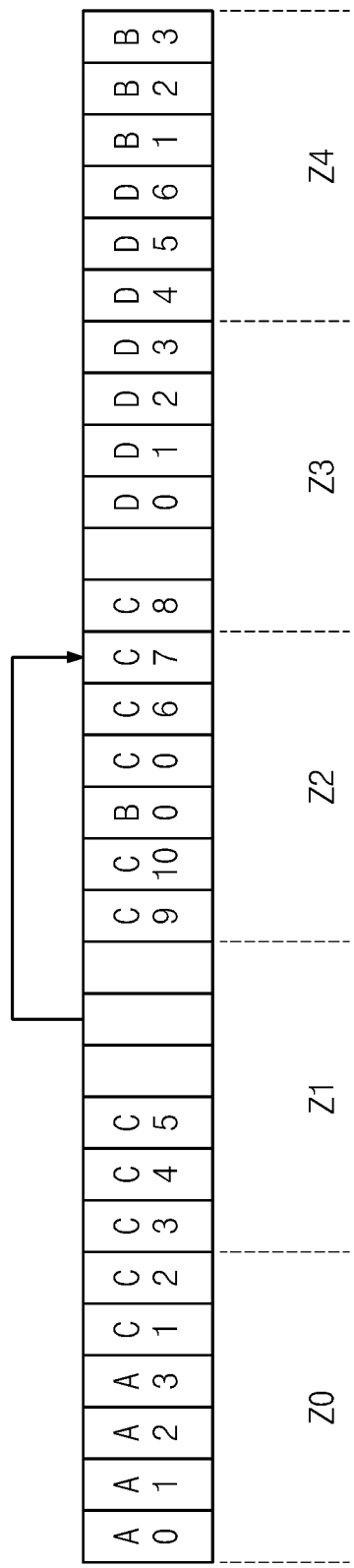
Figure 5D:
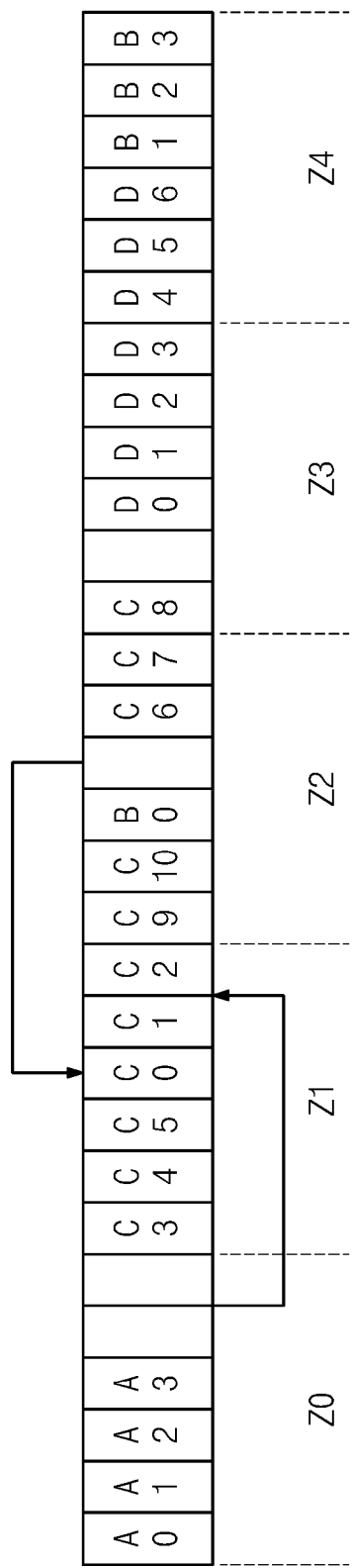
Figure 5E:
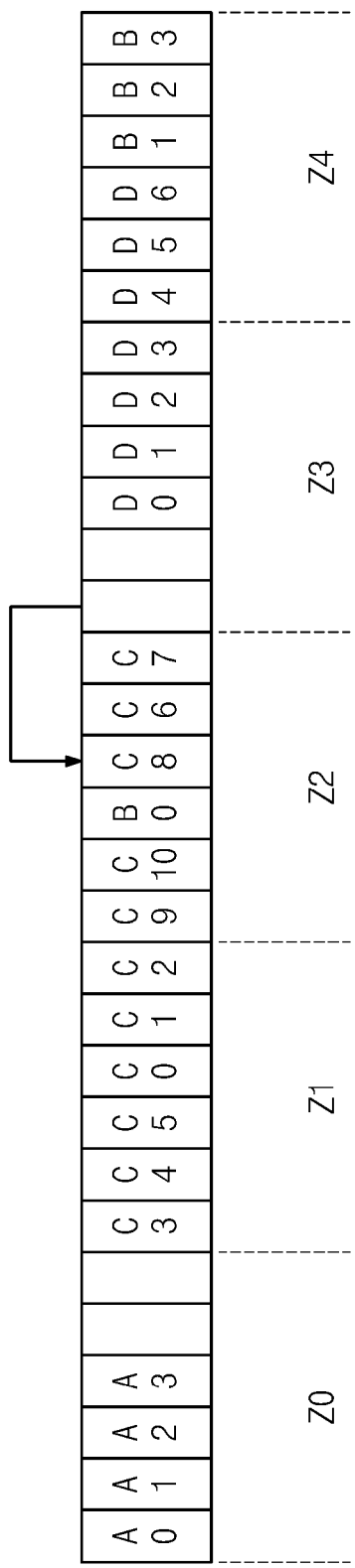

Since defragmentation on the file A is ended, file fragments C1 and C2 in the first zone Z0 has to be moved. As illustrated in FIG. 5C, file fragments C6, C7 and C8 may be moved to secure a space to which file fragments C0, C1 and C2 are to be moved. Then, as illustrated in FIG. 5D, a file fragment C0 in the third zone Z2 may be moved to the second zone Z1, and file fragment C1 and C2 in the first zone Z0 may be moved to the second zone Z1. To gather file fragments C6 to C10, as illustrated in FIG. 5E, a file fragment C8 in the fourth zone Z3 may be moved to the third zone Z2. Defragmentation on the file C may be completed through the above-described operations.

Then, defragmentation on the file B may be executed.

Figure 5F:
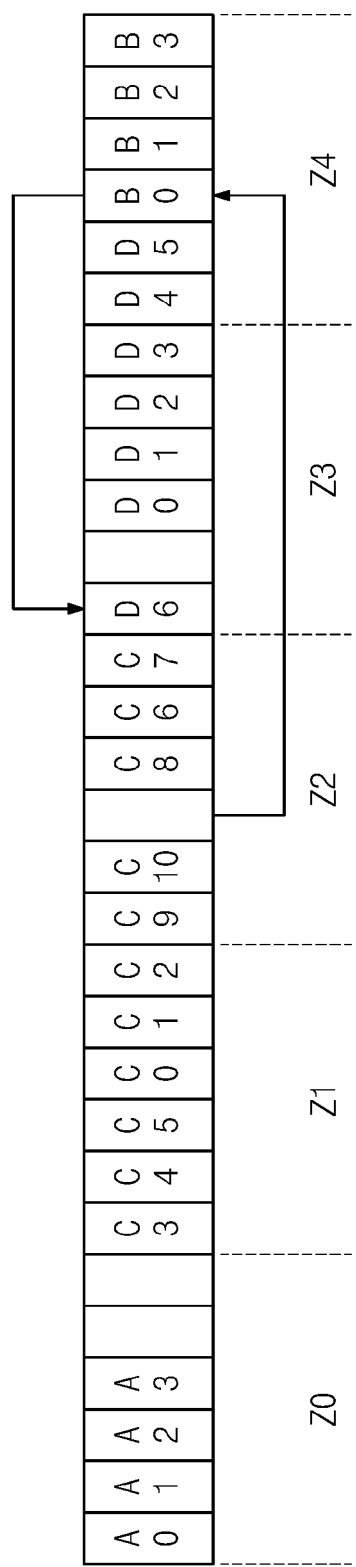

A usable space may be secure to move a file fragment B0 of the third zone Z1 to the fifth zone Z4. For this, as illustrated in FIG. 5F, a file fragment D6 may be moved to a free space of the third zone Z2. That is, a usable space may be secured to move a file fragment B0 in the third zone Z2 to the fifth zone Z4. Then, a file fragment B0 in the third zone Z2 may be moved to the fifth zone Z4. Defragmentation on the file B may be completed through the above-described operations.

Finally, defragmentation on the file D may be executed.

Figure 5G:
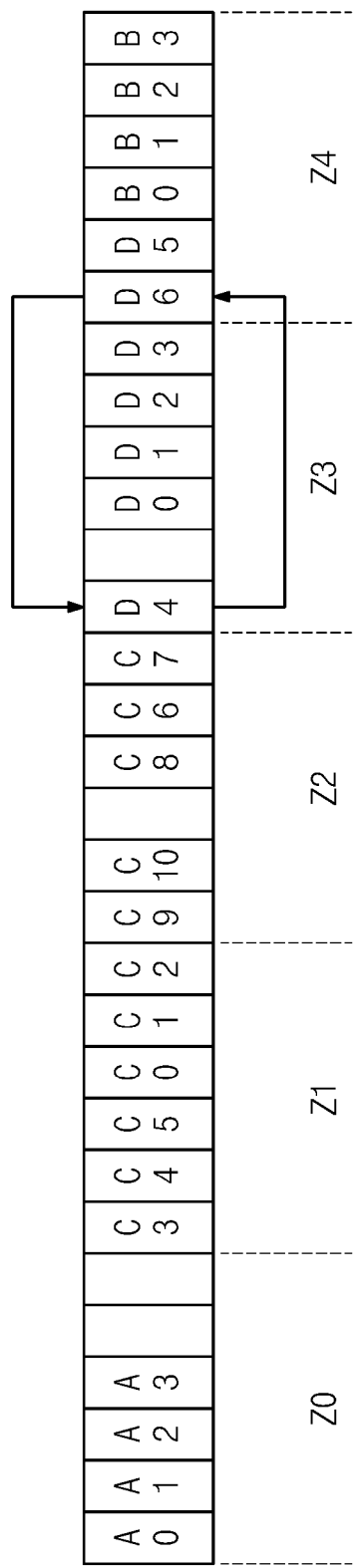
Figure 5H:
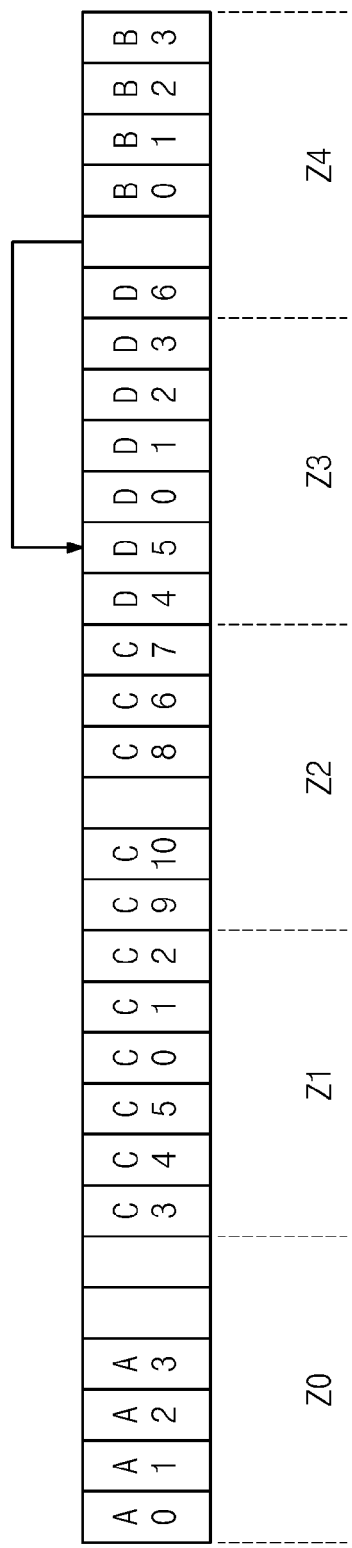

To gather file fragments D0 to D5 at the same zone Z4, as illustrated in FIG. 5G, a file fragment D4 may be moved to a location of a file fragment D6, and a file fragment D6 may be moved to a location of the file fragment D4. Then, as illustrated in FIG. 5H, a file fragment D5 may be moved to the fourth zone Z3. Defragmentation on the file D may be completed through the above-described operations.

In example embodiments, a storage space of a physical block where file fragments moved through defragmentation are stored may be invalidated through delete information provided from the host 100. Invalidation may be advantageous for garbage collection to be performed later. Here, the delete information may be transferred from the host 100 to the memory controller 200 following a write command. However, a point of time when the write command is transferred may not be limited to this disclosure.

FIGS. 6A to 6D are diagrams schematically illustrating relationship between a logical address space and a physical address space when file defragmentation according to example embodiments of inventive concepts is executed. For ease of description, there will be described a variation in a physical address space when defragmentation on a file A is executed.

Figure 6A:
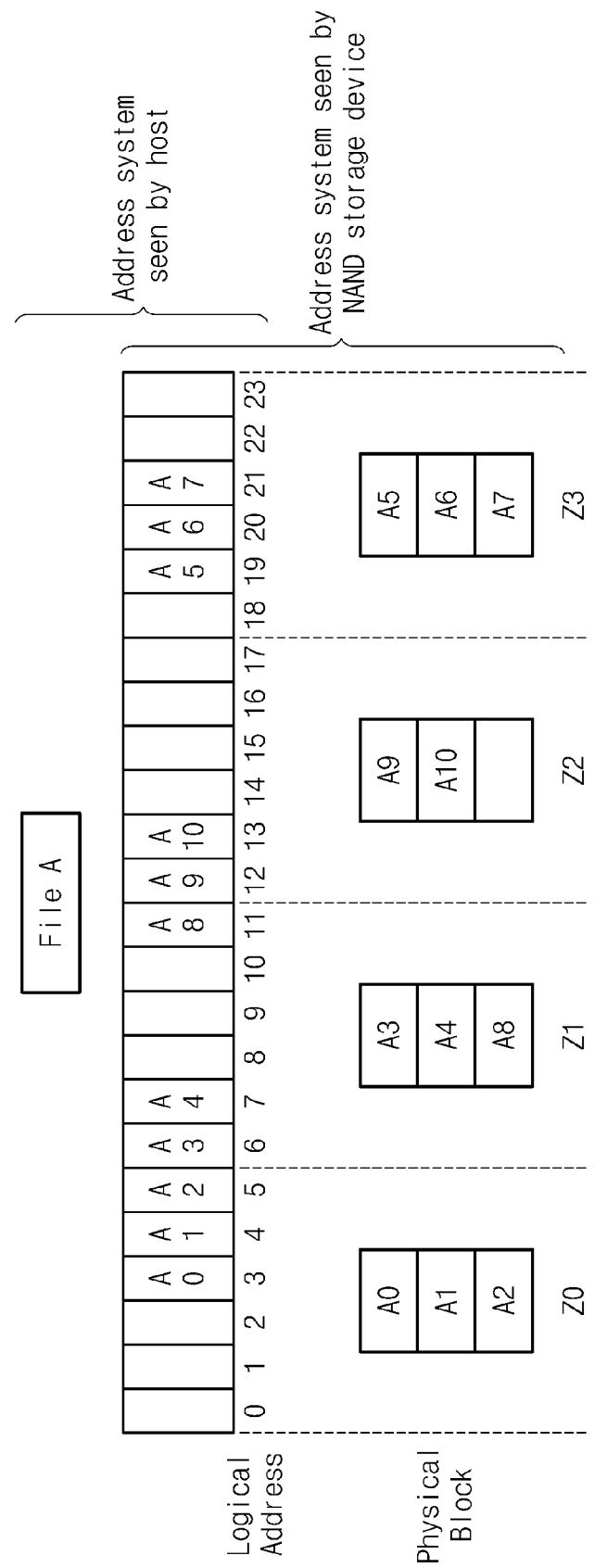
FIGS. 6A to 6D are diagrams schematically illustrating relationship between a logical address space and a physical address space when file defragmentation according to an example embodiment of inventive concepts is executed.

As illustrated in FIG. 6A, it is assumed that fragments A0 to A10 of a file A are stored at four zones Z0 to Z3. The relationship between the file A and logical addresses may be seen by a host 100, and the relationship between logical addresses and physical addresses may be seen by a memory controller 200.

Figure 6B:
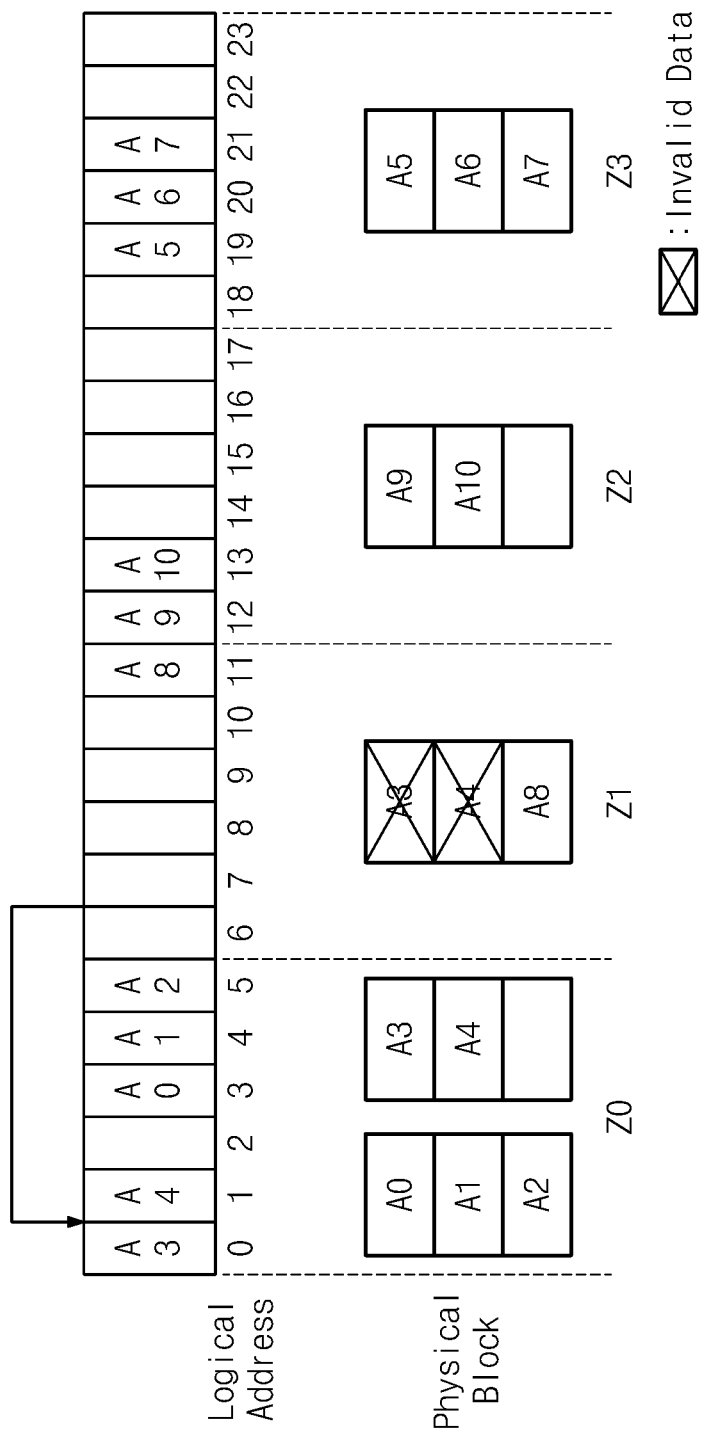

If defragmentation on the file A is executed, file fragments A3 and A4 in a second zone Z1 may be moved to a first zone Z0. Whether the first zone Z0 has a usable space may be determined prior to a transfer of the file fragments A3 and A4. In FIG. 6A, since the first zone Z0 has a usable space, the file fragments A3 and A4 in the second zone Z1 may be moved to the first zone Z0. In this case, as illustrated in FIG. 6B, a free block of a storage medium may be newly allocated to store the file fragments A3 and A4. The relationship between logical address and physical addresses of the file fragments A3 and A4 may be updated. Since the file fragments A3 and A4 in the second zone Z1 are moved to the first zone Z0, data stored at a physical block where the file fragments A3 and A4 are stored may be invalid. Invalid data of a physical block corresponding to the file fragments A3 and A4 may be managed through a mapping table.

Figure 6C:
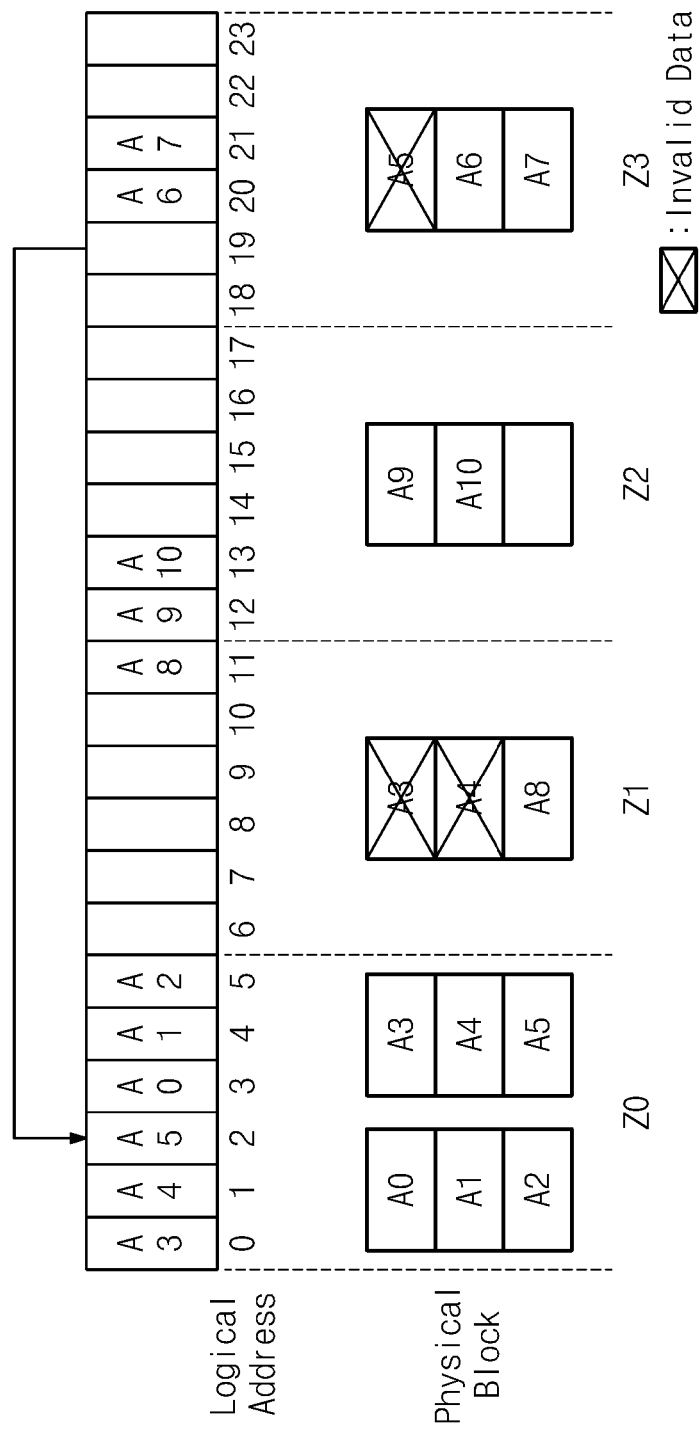

Then, a file fragment A5 in a fourth zone Z3 may be moved to the first zone Z0. Whether the first zone Z0 has a usable space may be determined prior to a transfer of the file fragment A5. As illustrated in FIG. 6C, since the first zone Z0 has a usable space, the file fragment A5 in the fourth zone Z3 may be moved to the first zone Z0. The file fragment A5 may be stored at a physical block where the file fragments A3 and A4 previously moved are stored. Since the file fragment A5 in the fourth zone Z3 is moved to the first zone Z0, data stored at a physical block where the file fragment A5 is stored may be invalid. Invalid data of a physical block corresponding to the file fragment A5 may be managed through the mapping table.

Figure 6D:
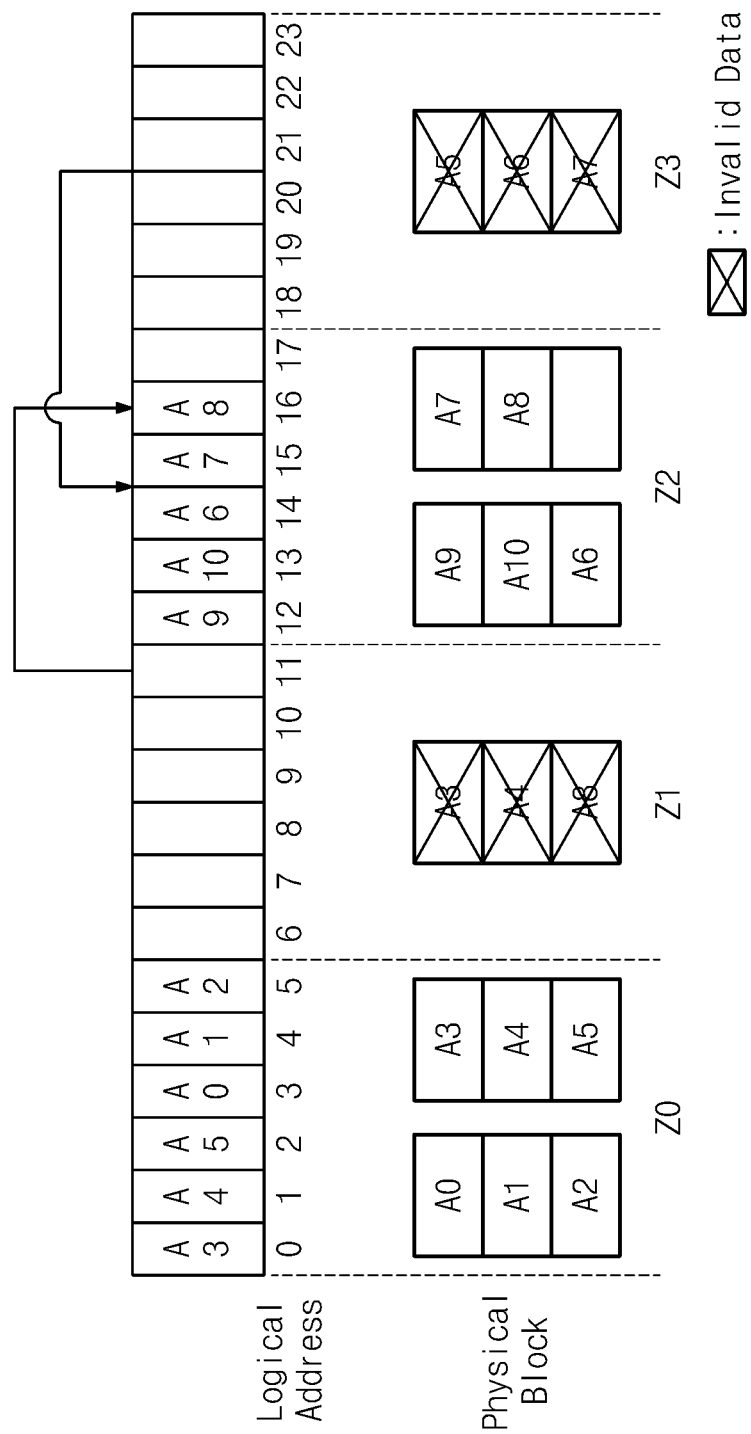

A file fragment A8 in the second zone Z1 and file fragments A6 and A7 in the fourth zone Z3 may be moved to the third zone Z2. Like the above description, whether the third zone Z2 has a usable space may be determined prior to a transfer of the file fragments A6 and A7. Since the third zone Z2 has a usable space, as illustrated in FIG. 6D, the file fragments A6 and A7 may be moved to the third zone Z2. In this case, a free block of the storage medium may be newly allocated to store the file fragments A6 and A7. Since the file fragments A6 and A7 in the fourth zone Z3 are moved to the third zone Z2, data stored at a physical block where the file fragments A6 and A7 are stored may be invalid. Invalid data of a physical block corresponding to the file fragments A6 and A7 may be managed through a mapping table.

Afterwards, a file fragment A8 in the second zone Z1 may be moved to the third zone Z2. Whether the third zone Z2 has a usable space may be determined prior to a transfer of the file fragment A8. As illustrated in FIG. 6D, since the third zone Z2 has a usable space, the file fragment A8 in the second zone Z1 may be moved to the third zone Z2. Since the file fragment A8 in the second zone Z1 is moved to the third zone Z2, data stored at a physical block where the file fragment A8 is stored may be invalid. Invalid data of a physical block corresponding to the file fragment A8 may be managed through the mapping table.

The above embodiments are described under assumption that each file fragment is moved to a selected zone through a read command and a write command when defragmentation on files is executed based on a zone. However, inventive concepts are not limited thereto. For example, read and write operations on fragments of a file to be defragmented may be executed by sending a set of commands to the memory controller 200 at a time. This will be more fully described below.

Figure 7:
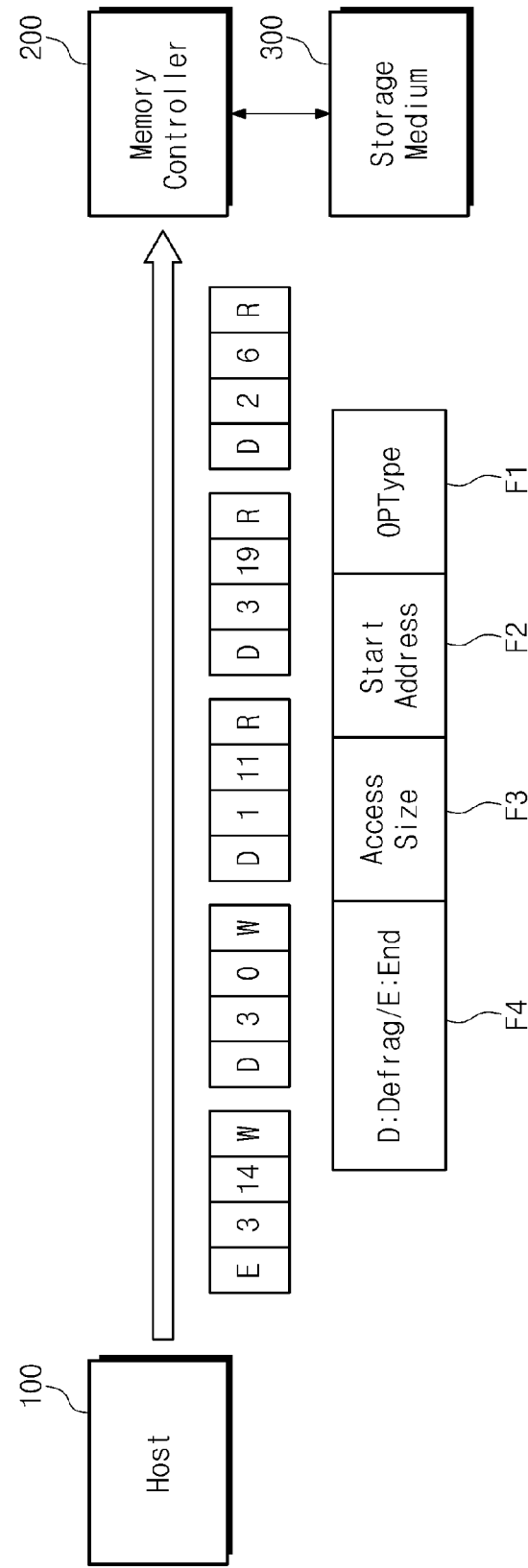
FIG. 7 is a diagram for defragmentation of a user device according to another example embodiment of inventive concepts.

FIG. 7 is a diagram for defragmentation of a user device according to another example embodiment of inventive concepts.

Referring to FIG. 7, a host 100 (e.g., an application program 110) may issue a defrag command to a memory controller 200 to control a storage medium 300. The defrag command may include an operand field F1, a start address field F2, an access size field F3, and a defrag/end field F4. The operand field F1 may include information directing a write operation or a read operation, and the start address field F2 may include start address information of a write/read operation. The access size field F3 may include information indicating a size of data to be written/read, and the defrag/end field F4 may include information indicating defragmentation or end of defragmentation.

In example embodiments, the defrag command may use a read/write command, and defrag/end may be marked at a reserved area or a context id of an input/output packet.

In a defrag command sent from the host 100 to the memory controller 200, for example, "R" may indicate a read operation, "W" may indicate a write operation, "D" may indicate defragmentation, and "E" may indicate end of defragmentation. In the event that "E" is included in the field F4, read and write operations corresponding to a set of defrag commands may be sequentially performed. This will be more fully described below.

Figure 8:
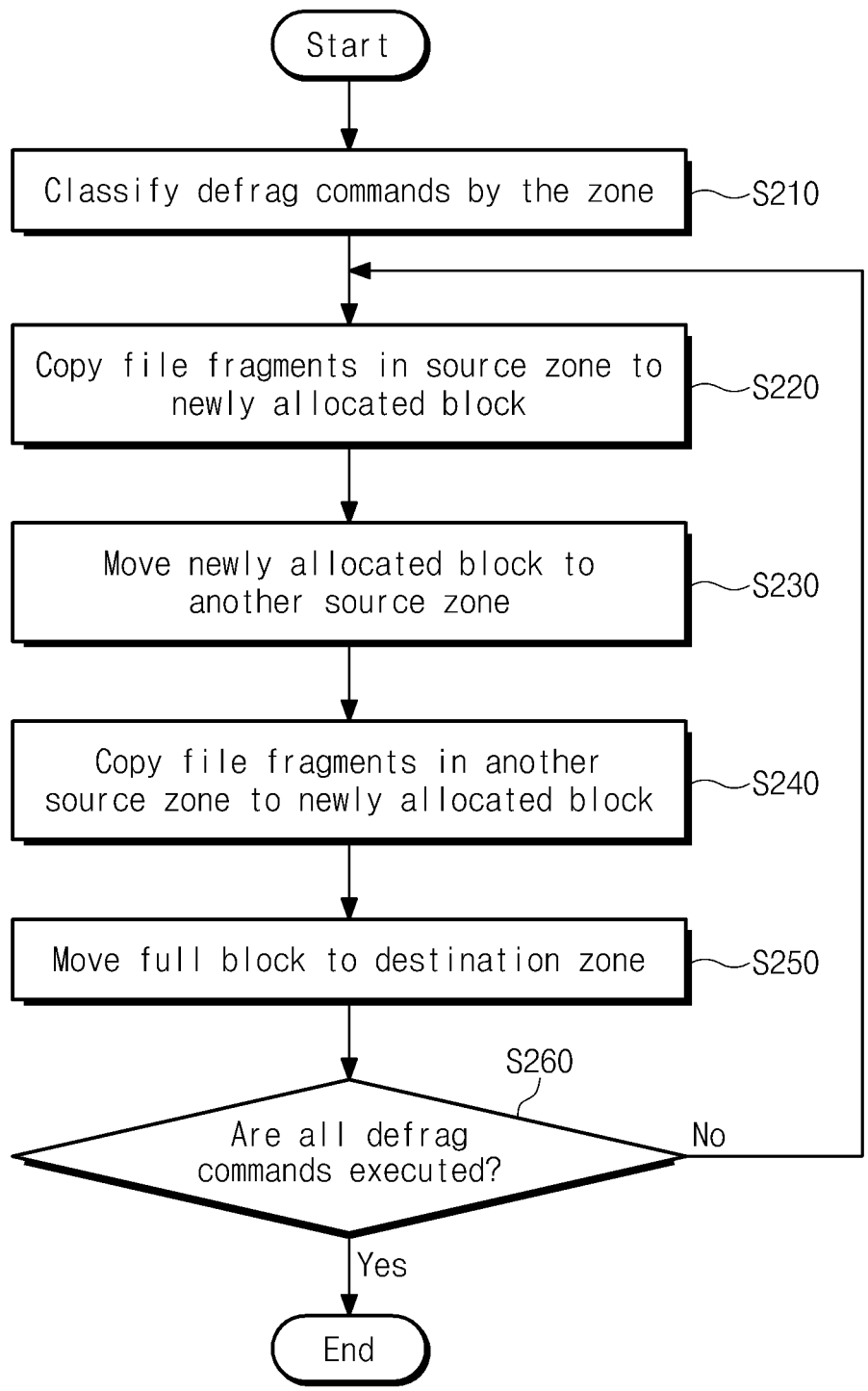
FIG. 8 is a flow chart schematically illustrating defragmentation of a user device using a defrag command described in FIG. 7.

FIG. 8 is a flow chart schematically illustrating defragmentation of a user device using a defrag command described in FIG. 7. FIGS. 9A to 9G are diagrams schematically illustrating variations of physical blocks at defragmentation of a user device using a defrag command described in FIG. 7.

Figure 9A:
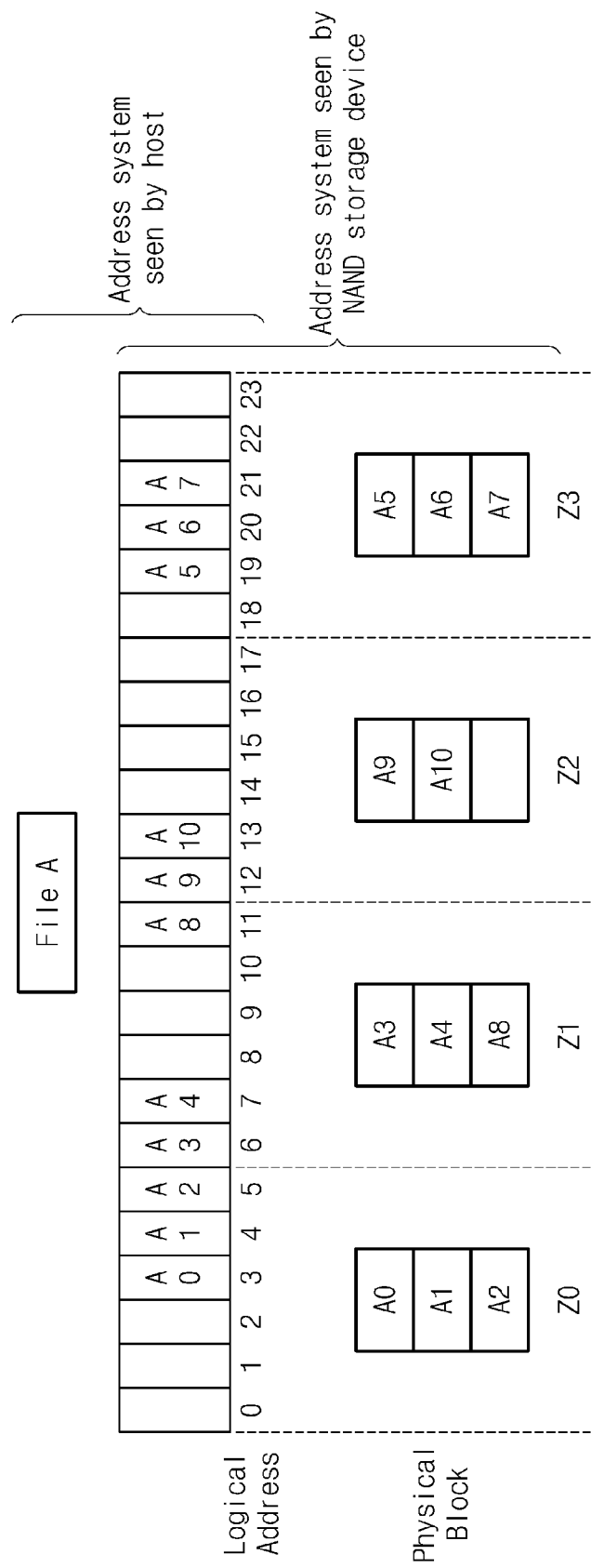

Referring to FIG. 9A, it is assumed that fragments A0 to A10 of a file A are stored at four zones Z0 to Z4. The relationship between the file A and logical addresses may be seen by a host 100, and the relationship between logical addresses and physical addresses may be seen by a memory controller 200. Defragmentation on the file A may be made by continuously sending a series of defrag commands from a host 100 to a memory controller 200. For ease of description, it is assumed that a series of defrag commands illustrated in FIG. 7 is from the host 100 to the memory controller 200. In this case, file fragments A3, A4, A5, A6, and A7 corresponding to logical address 6, 7, 19, 20, 21, and 11 as a source address may be moved to zones respectively corresponding to logical addresses 0, 1, 2, 14, 15, and 16.

Referring to FIG. 8, in operation S210, the memory controller 200 may classify defrag commands by the zone. For example, the memory controller 200 may decide zones, to which file fragments are to be moved, based on the source address 6, 7, 19, 20, 21, and 11 and destination addresses 0, 1, 2, 14, 15, and 16. In other words, classification of defrag commands by the zone may be made based on a destination zone. In case of an example illustrated in FIG. 8A, the memory controller 200 may select a first zone Z0 and a third zone Z2 as zones to which file fragments are to be moved. However, inventive concepts are not limited thereto. For example, a second zone Z1 and a fourth zone Z4 can be selected as zones to which file fragments are to be moved.

In example embodiments, file fragments may be moved to the first zone Z0, and then file fragments may be moved to the third zone Z2. Alternatively, file fragments may be moved to the third zone Z2, and then file fragments may be moved to the first zone Z0. As a result, source and destination addresses input through a series of defrag commands may be classified into two defrag commands Defrag(7,6,10),(0,1,2) and Defrag(20,21,11),(14,15,16) respectively corresponding to zones (e.g., Z0 and Z2) to which file fragments are to be moved.

Figure 9B:
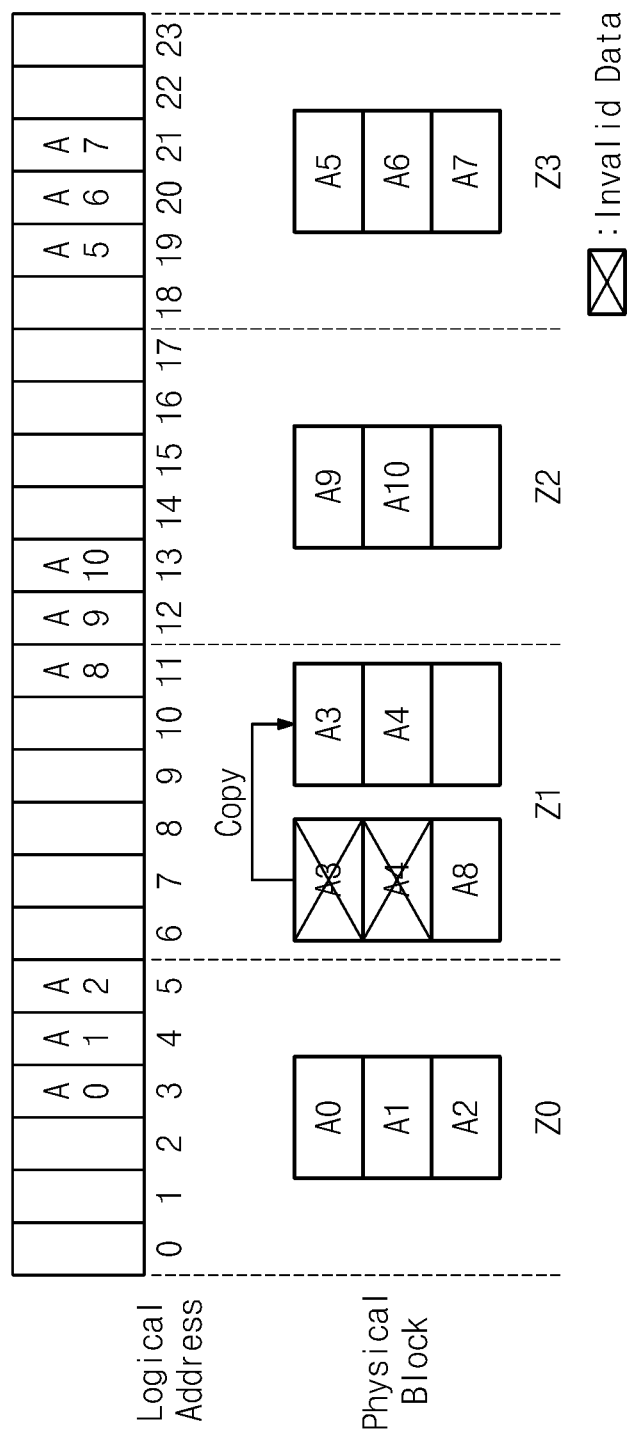
Figure 9C:
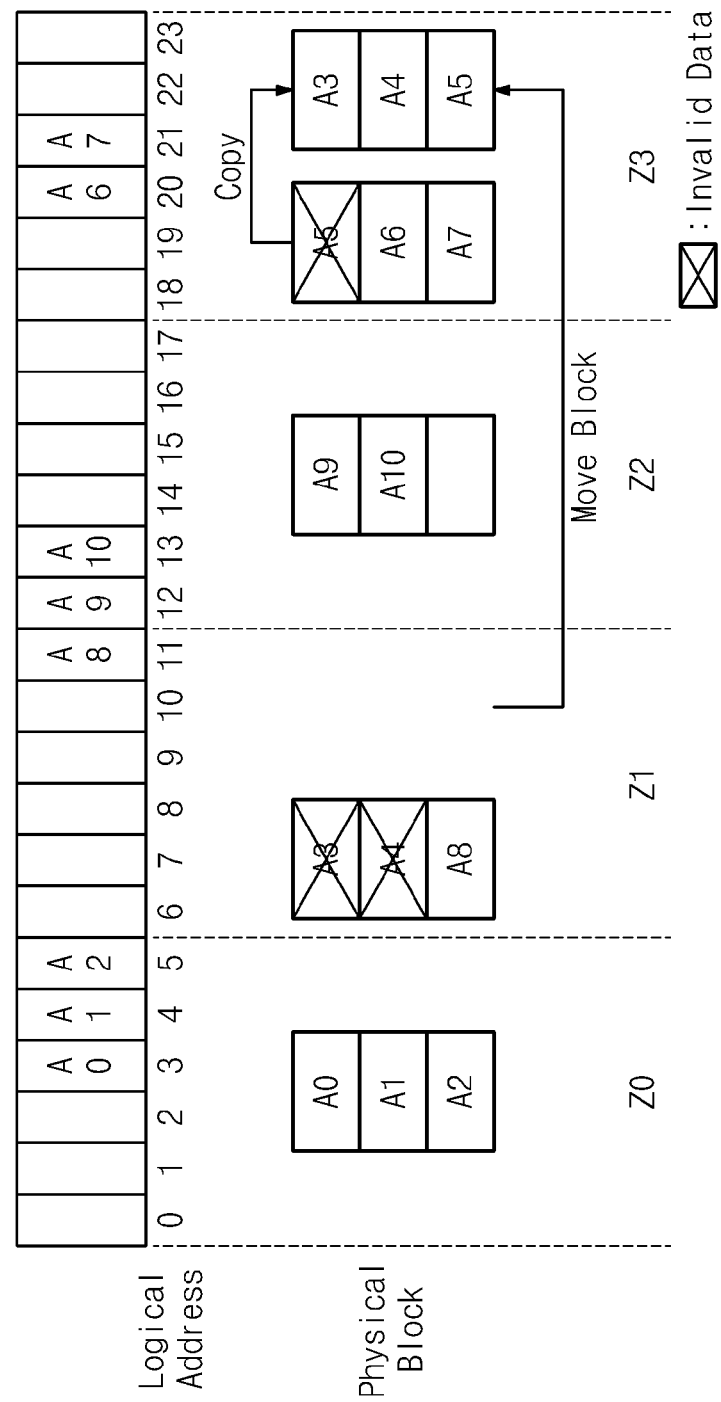
Figure 9D:
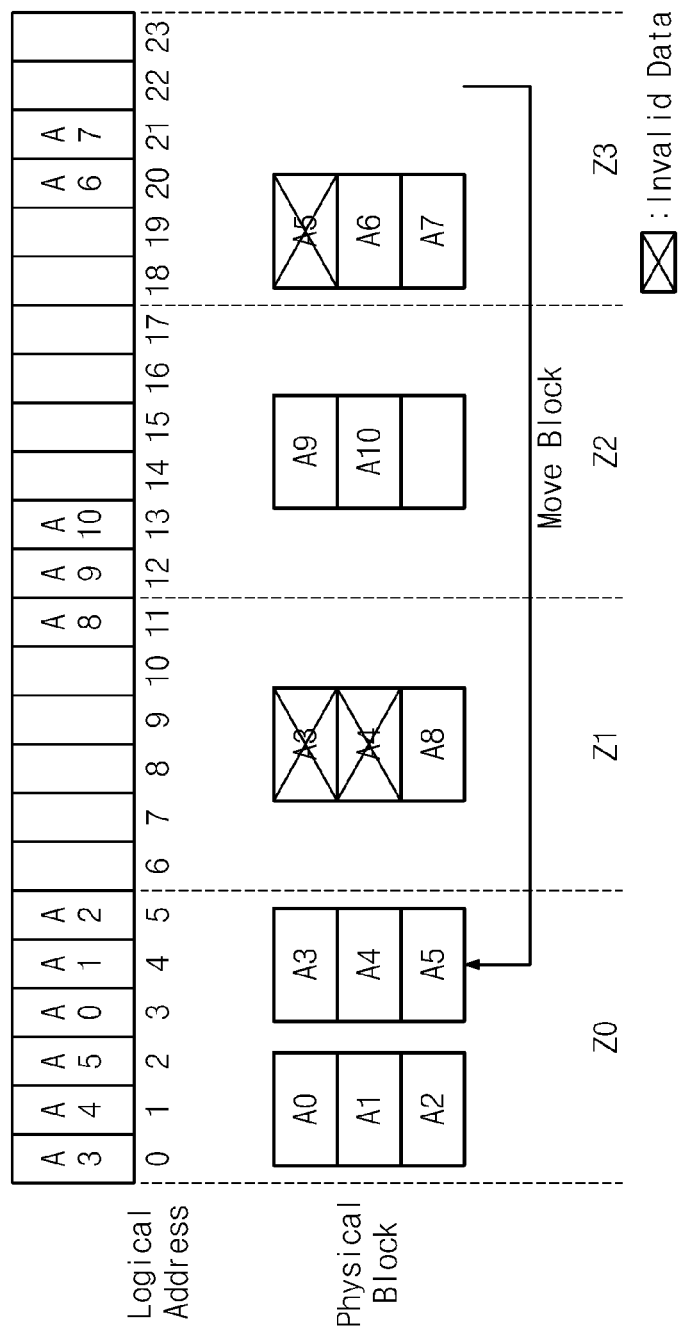

Below, an operation (Defrag(7,6,10),(0,1,2)) of moving file fragments A3, A4 and A5 to the first zone Z0 will be more fully described with reference to FIGS. 9B to 9D.

In operation S220, file fragments in a source zone may be copied to a newly allocated block. For example, referring to FIG. 9B, the memory controller 200 may allocate a new block to which file fragments A3 and A4 in the second zone Z1 are to be moved. The file fragments A3 and A4 in the second zone Z1 may be copied to the new block. At this time, storage spaces of a physical block corresponding to the file fragments A3 and A4 may be marked by an invalid area. This may be made through updating of a mapping table.

In operation S230, a newly allocated block may be moved to another source zone. For example, as illustrated in FIG. 9C, a physical block where the file fragments A3 and A4 are stored may be moved to the fourth zone Z3. This may be made by changing the mapping table. In operation S240, file fragments in another zone may be copied to the newly allocated block. For example, as illustrated in FIG. 9C, a file fragment A5 in the fourth zone Z3 may be copied to the physical block where the file fragments A3 and A4 are stored. In operation S250, a data full block may be moved to a destination zone. For example, as illustrated in FIG. 9D, a physical block where the file fragments A3, A4 and A5 are stored may be moved to the first zone Z0. This may be made through changing the mapping table.

The operation (Defrag (7,6,10),(0,1,2)) of moving file fragments A3, A4 and A5 to the first zone Z0 may be completed through the above operations.

In operation S250, whether all defrag commands are executed may be determined. If so, the method may be ended. If not, the method may proceed to operation S220. Afterwards, an operation (Defrag (20,21,11),(14,15,16)) of moving file fragments to the third zone Z2 will be executed through operations S220 to S250. This will be more fully described with reference to FIGS. 9E to 9G.

Figure 9E:
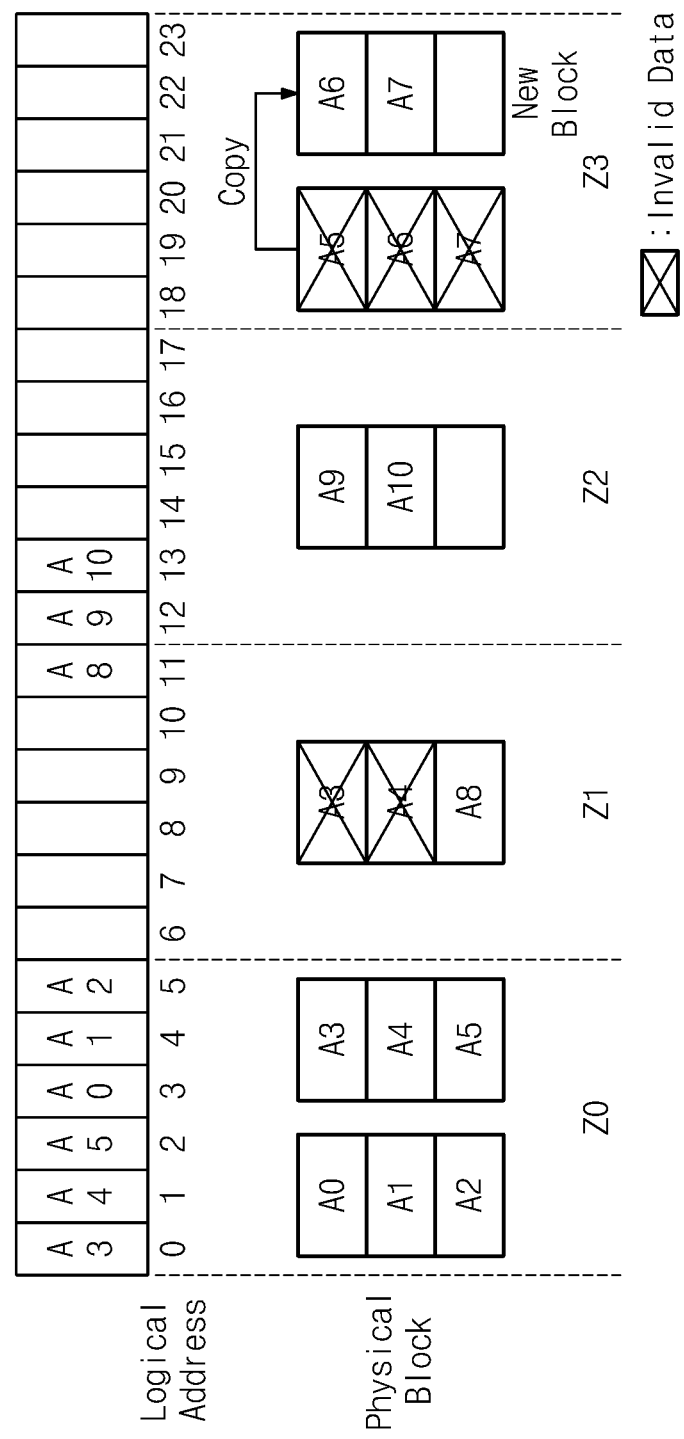
Figure 9F:
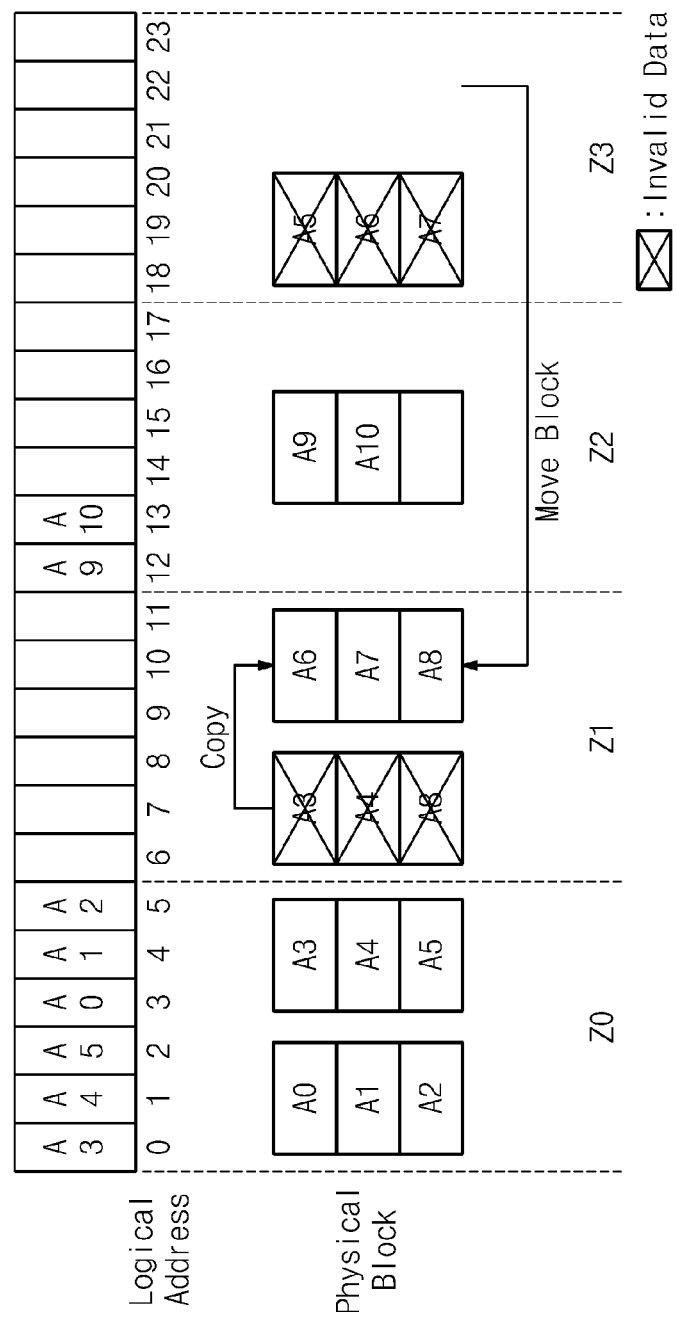

Referring to FIG. 9E, the memory controller 200 may allocate a new block to move file fragments A6 and A7 in the fourth zone Z3. The file fragments A6 and A7 in the fourth zone Z3 may be copied to a new block. At this time, storage spaces of a physical block corresponding to the file fragments A6 and A7 may be marked by an invalid area. This may be made through updating of the mapping table. In this case, a physical block in the fourth zone Z3 where invalid data A5, A6 and A7 are stored may be managed as an invalid block. Then, as illustrated in FIG. 9F, a physical block where the file fragments A6 and A7 are stored may be moved to the second zone Z1. This may be made through updating of the mapping table. A file fragment A8 in the second zone Z1 may be copied to a physical block where the file fragments A6 and A7 are stored. At this time, a storage space of a physical block corresponding to the file fragment A5 may be marked as an invalid area. In this case, a physical block in the second zone Z1 where invalid data A3, A4 and A8 are stored may be managed as an invalid block. Finally, as illustrated in FIG. 9G, a physical block where the file fragments A6, A7 and A8 are stored may be moved to the third zone Z2. This may be made through a change of the mapping table.

The operation (Defrag (20,21,11),(14,15,16)) of moving file fragments A6, A7 and A8 to the third zone Z2 may be completed through the above operations.

Referring to FIGS. 6D and 9G, a result (FIG. 9G) of defragmentation performed through defrag commands may be the same as a result (FIG. 6D) of defragmentation performed through iteration of read and write commands. A file fragment transfer between zones generated when defragmentation is executed through defrag commands may be reduced as compared to that generated when defragmentation is executed through iteration of read and write commands.

The above embodiments are described under assumption that arrangement of file fragments in the same zone is not considered. However, inventive concepts are not limited thereto. For example, file fragments in the same zone may be sequentially rearranged by changing mapping information using an LBA (logical block addressing) command without an actual transfer of data stored at a storage medium 300. This will be more fully described below.

Figure 10:
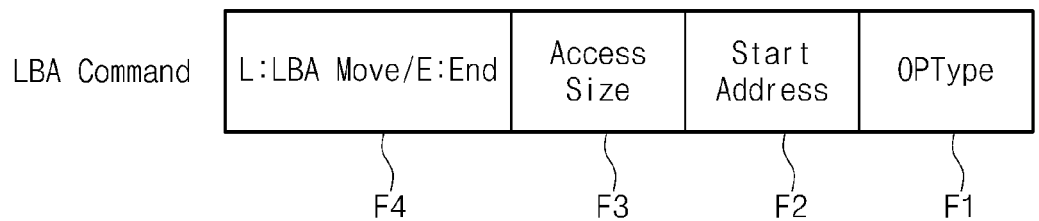
FIG. 10 is a diagram schematically illustrating an LBA (logical block addressing) command for data rearrangement according to an example embodiment of inventive concepts.

FIG. 10 is a diagram schematically illustrating an LBA command for data rearrangement according to an example embodiment of inventive concepts.

Referring to FIG. 10, to sequentially arrange file fragments in the same zone, a host 100 (e.g., an application program 110) may issue an LBA command to a memory controller 200 to control a storage medium 300. The LBA command may include an operand field F1, a start address field F2, an access size field F3, and an LBA move/end field F4. The operand field F1 may include information directing a write operation or a read operation, and the start address field F2 may include start address information of a write/read operation. The access size field F3 may include information indicating a size of data to be written/read, and the LBA move/end field F4 may include information indicating LBA move or end of LBA mode.

In example embodiments, the LBA command may use a read/write command, and LBA move/end may be marked at a reserved area or a context id of an input/output packet.

In an LBA command sent from the host 100 to the memory controller 200, for example, "R" may indicate a read operation, "W" may indicate a write operation, "L" may indicate LBA move, and "E" may indicate end of LBA mode.

Figure 11A:
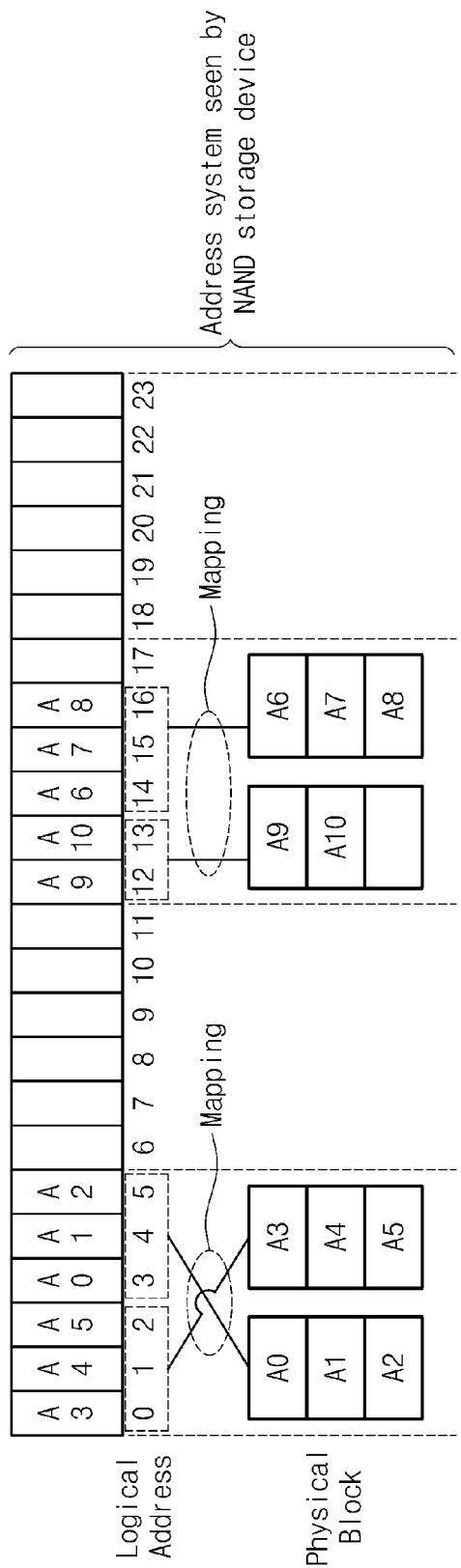
FIGS. 11A to 11C are diagrams for describing a data rearrangement operation using an LBA command in a user device according to an example embodiment of inventive concepts.
Figure 11B:
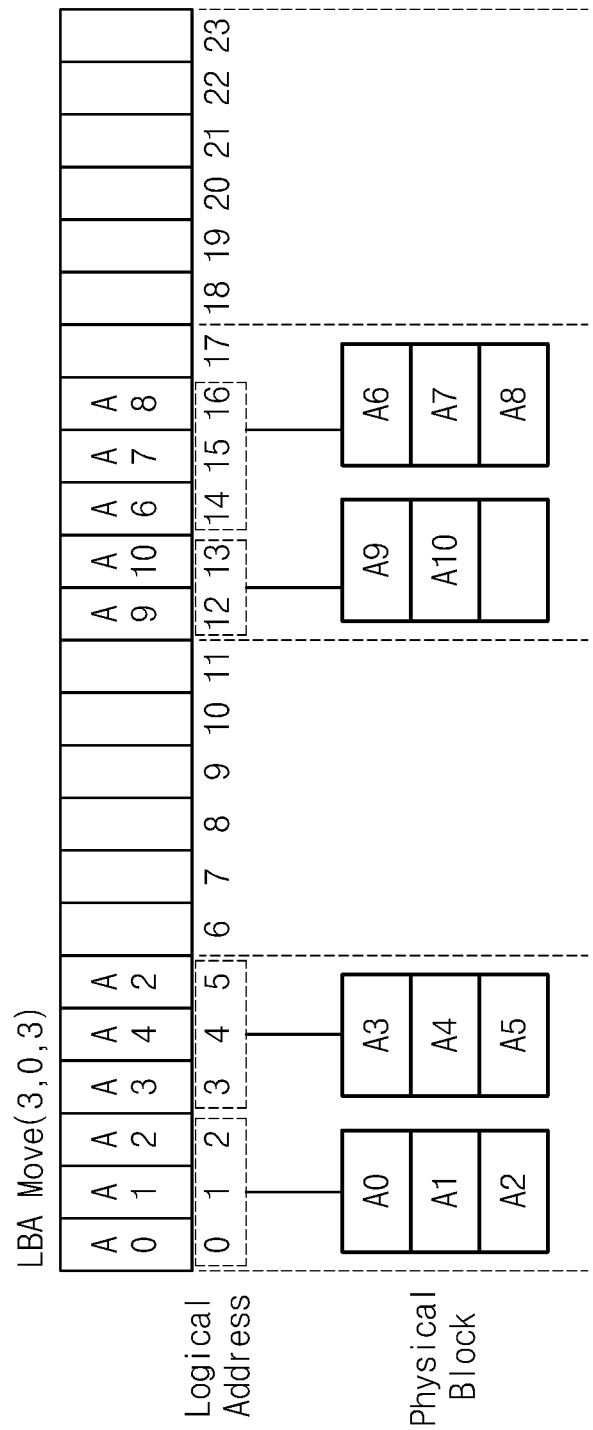
Figure 11C:
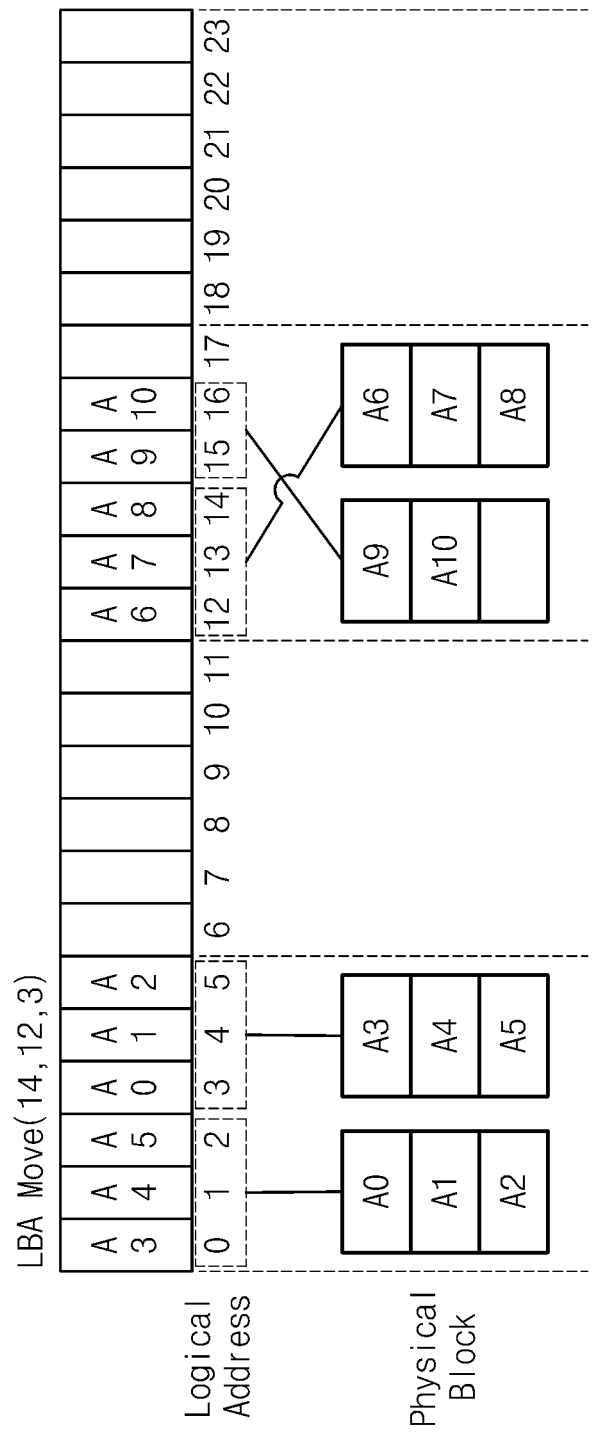

FIGS. 11A to 11C are diagrams for describing a data rearrangement operation using an LBA command in a user device according to an example embodiment of inventive concepts.

An address system illustrated in FIG. 11A may be substantially the same as that of FIG. 9G showing a defragmentation-completed result according to an example embodiment of inventive concepts. In a first zone Z0, logical addresses 0, 1 and 2 may be mapped on a physical block where file fragments A3, A4 and A5 are stored, and logical addresses 3, 4 and 5 may be mapped on a physical block where file fragments A0, A1 and A2 are stored. In a third zone Z2, logical addresses 14, 15 and 16 may be mapped on a physical block where file fragments A6, A7 and A8 are stored, and logical addresses 12 and 13 may be mapped on a physical block where file fragments A9 and A10 are stored. The file fragments A0 to A5 in the first zone Z0 may not be sequential. In this case, two read operations may be required to read the file fragments A0 to A5 in the first zone Z0. For example, since the file fragments A0 to A5 in the first zone Z0 is not sequential, a read operation on the file fragments A3 to A5 and a read operation on the file fragments A0 to A2 may be required. Likewise, the file fragments A6 to A10 in the third zone Z2 may not be sequential. In this case, two read operations may be required to read the file fragments A6 to A10 in the third zone Z2. For example, since the file fragments A6 to A10 in the third zone Z2 is not sequential, a read operation on the file fragments A6 to A8 and a read operation on the file fragments A9 and A10 may be required.

Exemplary LBA move (3, 0, 3) is illustrated in FIG. 11B. The LBA move (3, 0, 3) may be to move three continuous file fragments from a logical address 3 as a start address to a logical address 0 as a destination address. The file fragments A0 to A5 in the first zone Z0 may be sequentially rearranged through the LBA move (3, 0, 3). In this case, as illustrated in FIG. 11B, data may not be moved in a storage medium 300. That is, mapping relationship between logical addresses and physical addresses may be changed under a control of the memory controller 200 (e.g., a flash translation layer FTL).

Exemplary LBA move (14, 12, 3) is illustrated in FIG. 11C. The LBA move (14, 12, 3) may be to move three continuous file fragments from a logical address 14 as a start address to a logical address 12 as a destination address. The file fragments A6 to A10 in the third zone Z2 may be sequentially rearranged through the LBA move (14, 12, 3). In this case, as illustrated in FIG. 11C, data may not be moved in the storage medium 300. That is, mapping relationship between logical addresses and physical addresses may be changed under a control of the memory controller 200 (e.g., a flash translation layer FTL).

Figure 12:
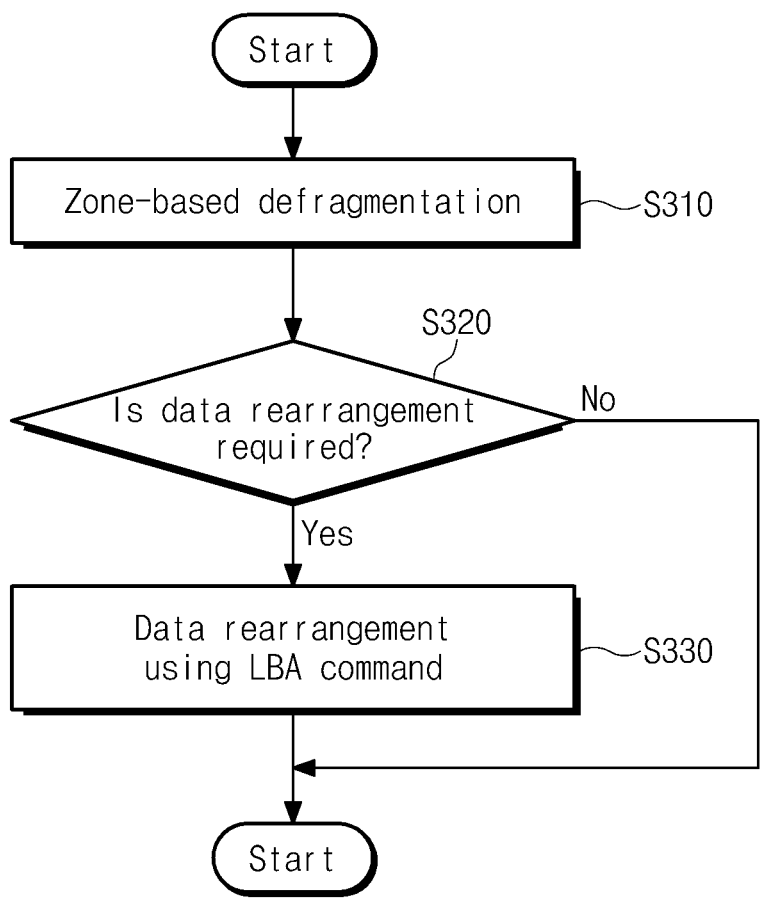
FIG. 12 is a flow chart schematically illustrating defragmentation of a user device according to another example embodiment of inventive concepts.

FIG. 12 is a flow chart schematically illustrating defragmentation of a user device according to another example embodiment of inventive concepts.

In operation S310, an application program 110 may execute zone-based defragmentation. Here, defragmentation may be performed according to a manner described with reference to FIGS. 5A to 5H, a manner described with reference to FIGS. 6A to 6D or a manner described with reference to FIGS. 9A to 9G.

In example embodiments, in the event that defragmentation executed according to a manner described with reference to FIGS. 9A to 9G is completed, a memory controller 200 may set a physical block storing invalid data to an invalid block without additional information of a host 100. That the physical block storing invalid data is set to an invalid block through defragmentation may be helpful to secure a usable space through garbage collection to be performed later.

In operation S320, the application program 110 may determine whether data rearrangement on a defragmented zone is required. If data rearrangement on a defragmented zone is not required, the method may be ended.

If data rearrangement on a defragmented zone is required, the method may proceed to operation S330. In operation S330, the application program 110 may issue an LBA command to a memory controller 200 to rearrange data in defragmented zone(s). This may be made in a manner described with reference to FIGS. 11A to 11C. If data rearrangement on the defragmented zone(s) is ended, the method may be terminated.

In example embodiments, a defragmentation technique according to an example embodiment of inventive concepts may be more effective when mapping relationship between logical addresses and physical addresses are managed by the zone. In the event that a source zone where a file fragment to be copied exists is different from a destination zone where a file fragment is to be copied, mapping information managed by a flash translation layer may be replaced with mapping information of a destination zone stored at a storage medium 300. Thus, an increase in an input/output time between a host 100 and the memory controller 200 due to exchange of mapping information may be reduced by performing defragmentation on the basis of a zone.

Figure 13:
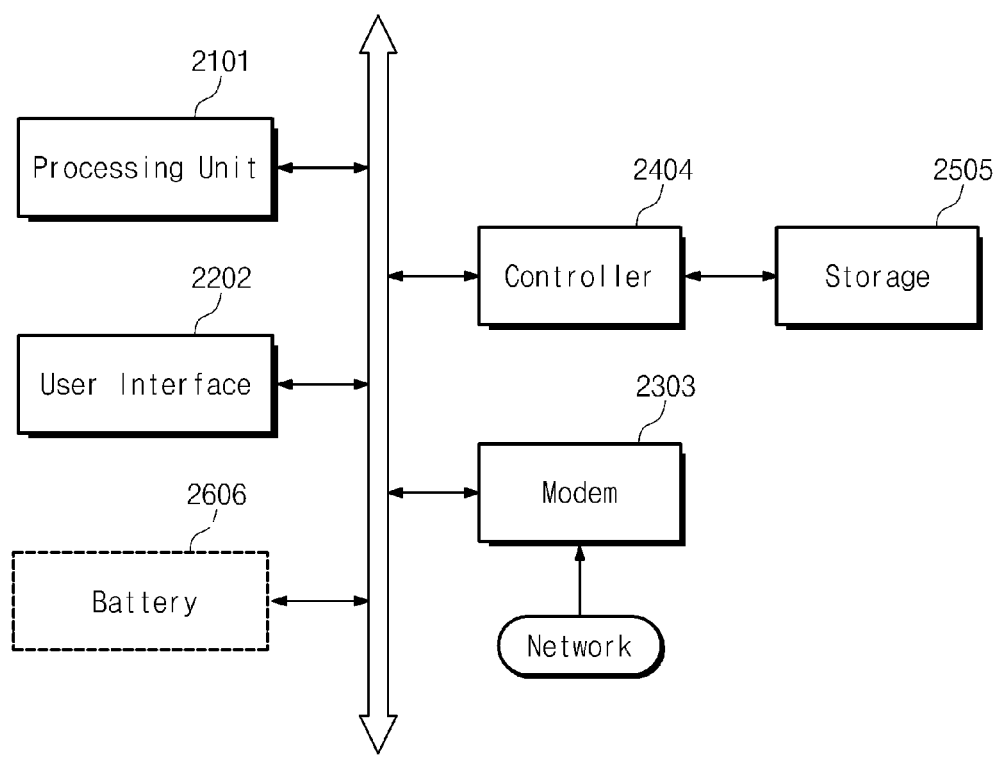
FIG. 13 is a block diagram schematically illustrating a computing system according to an example embodiment of inventive concepts.

FIG. 13 is a block diagram schematically illustrating a computing system according to an example embodiment of inventive concepts. A computing system may include a processing unit 2101, a user interface 2202, a modem 2303 such as a baseband chipset, a memory controller 2404, and storage medium 2505.

The memory controller 2404 and the storage medium 2505 may be configured substantially the same as that illustrated in FIG. 1. For example, it is possible to manage defragmentation fast and efficiently through division management of a logical address space. Also, it is possible to efficiently process an operation associated with defragmentation through a defragmentation command/LAB command.

N-bit data (N being 1 or more integer) processed/to be processed by the processing unit 2101 may be stored in the storage medium 2505 through the memory controller 2404. In the event that the computing system is a mobile device, a battery 2606 may be further included in the computing system to supply an operating voltage thereto. Although not illustrated in FIG. 10, the computing system may further comprise an application chipset, a camera image processor (CIS), a mobile DRAM, and the like.

Figure 14:
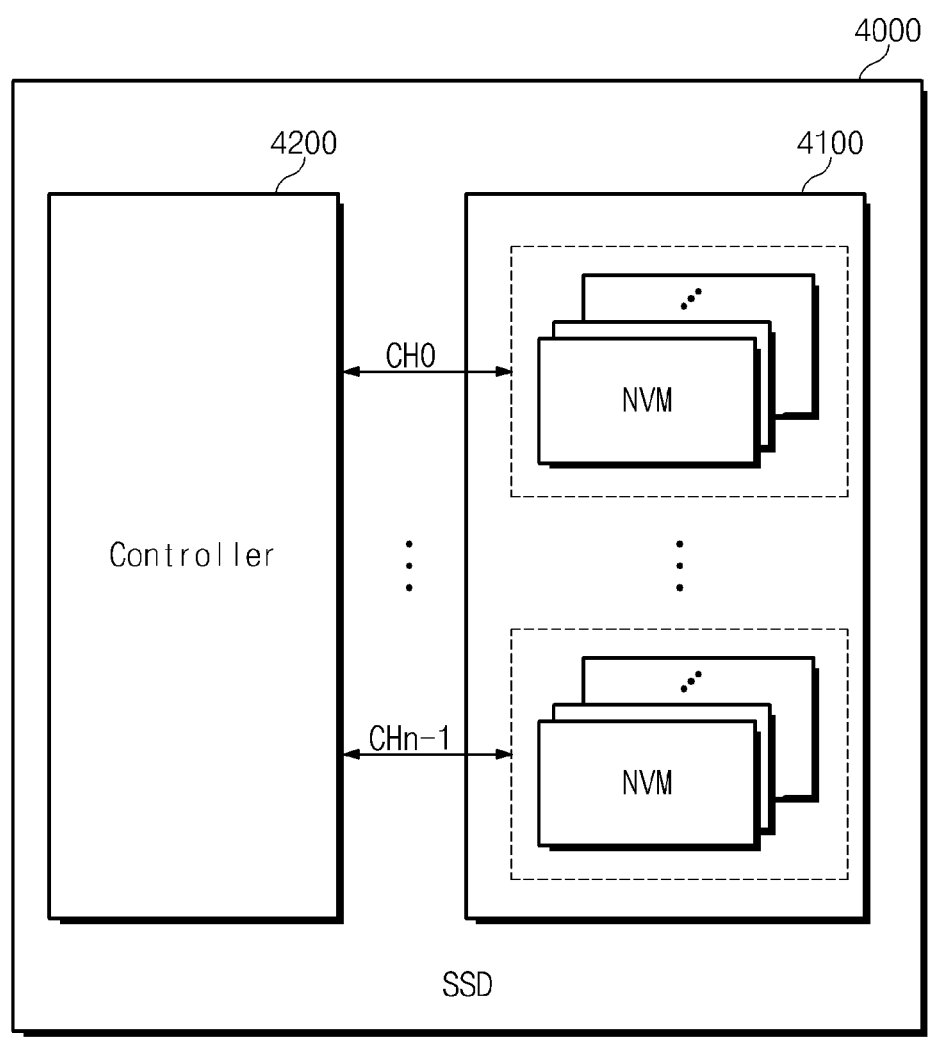
FIG. 14 is a block diagram schematically illustrating a solid state drive according to an example embodiment of inventive concepts.

FIG. 14 is a block diagram schematically illustrating a solid state drive according to an example embodiment of inventive concepts.

Referring to FIG. 14, a solid state drive (SSD) 4000 may comprise storage medium 4100 and a controller 4200. The storage medium 4100 may be connected with the controller 4200 via a plurality of channels, each of which is commonly connected with a plurality of nonvolatile memories. The controller 4200 and the storage medium 4100 may be configured substantially the same as that illustrated in FIG. 1. For example, it is possible to manage defragmentation fast and efficiently through division management of a logical address space. Also, it is possible to efficiently process an operation associated with defragmentation through a defragmentation command/LAB command.

Figure 15:
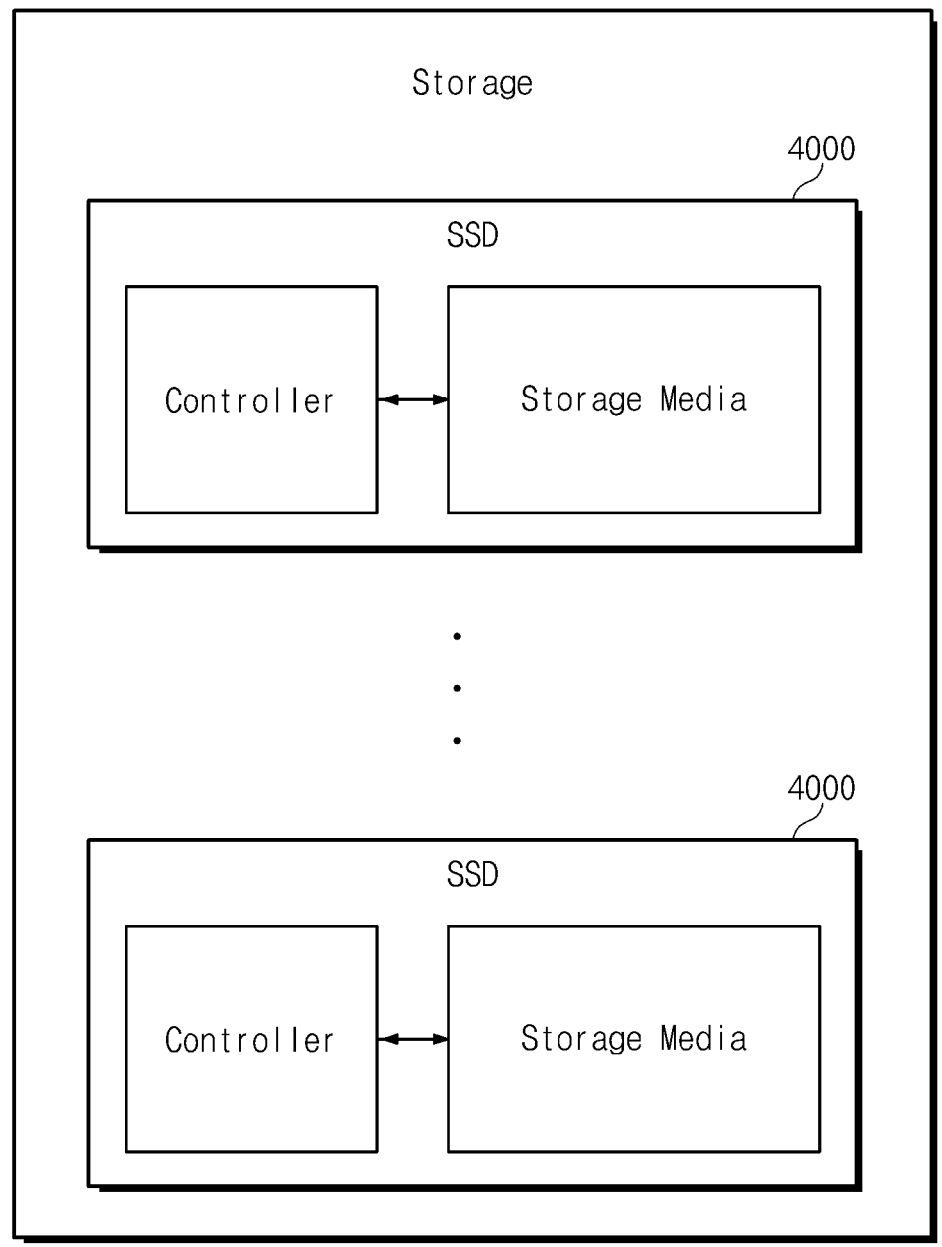
FIG. 15 is a block diagram schematically illustrating a storage using a solid state drive in FIG. 14.
Figure 16:
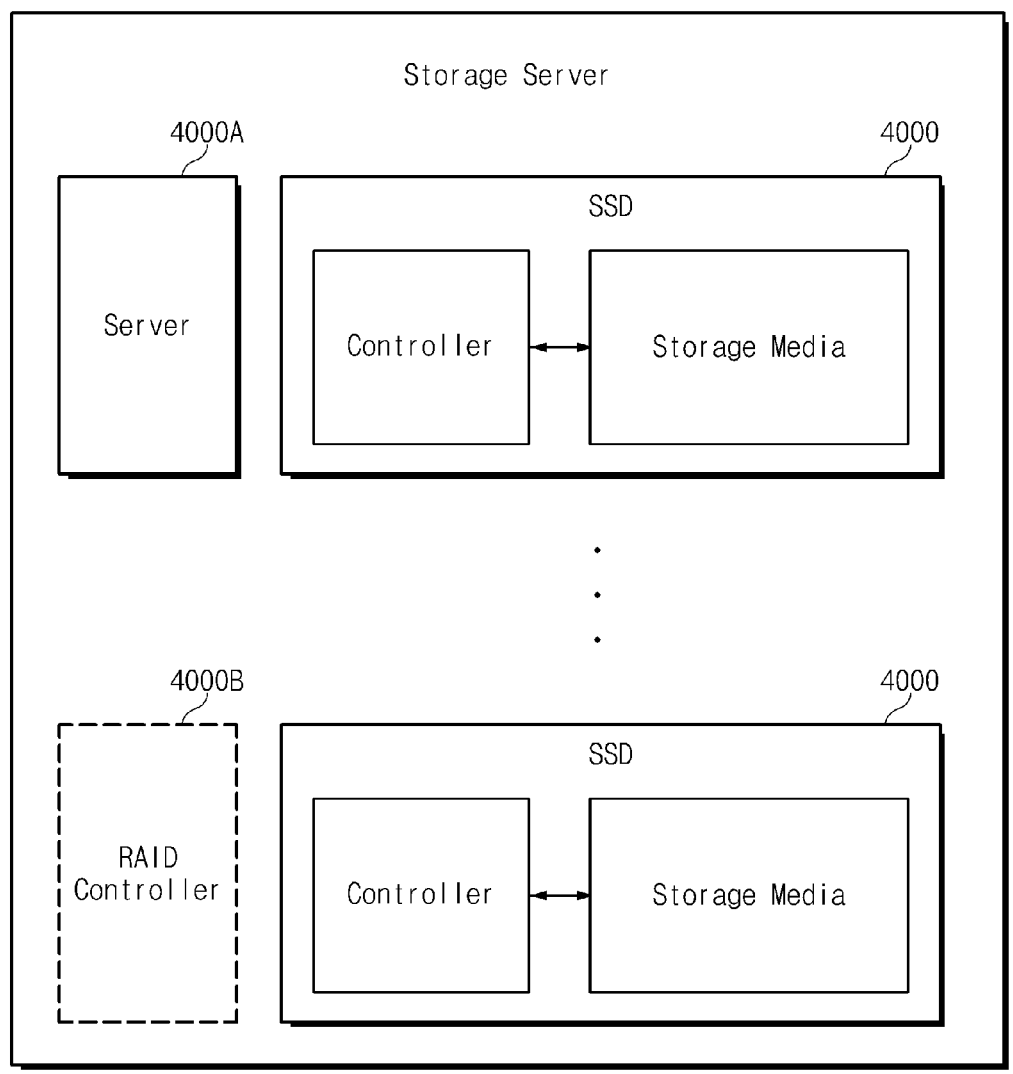
FIG. 16 is a block diagram schematically illustrating a storage server using a solid state drive in FIG. 14.

FIG. 15 is a block diagram schematically illustrating a storage using a solid state drive in FIG. 14, and FIG. 16 is a block diagram schematically illustrating a storage server using a solid state drive in FIG. 14.

An SSD 4000 according to an example embodiment of inventive concepts may be used to form the storage. As illustrated in FIG. 15, the storage may include a plurality of solid state drives 4000 which are configured the same as described in FIG. 14. An SSD 4000 according to an example embodiment of inventive concepts may be used to configure a storage sever. As illustrated in FIG. 16, a storage server includes a plurality of solid state drives 4000, which are configured the same as described in FIG. 14, and a server 4000A. Further, it is well comprehended that a well-known RAID controller 4000B is provided in the storage server.

Figure 17:
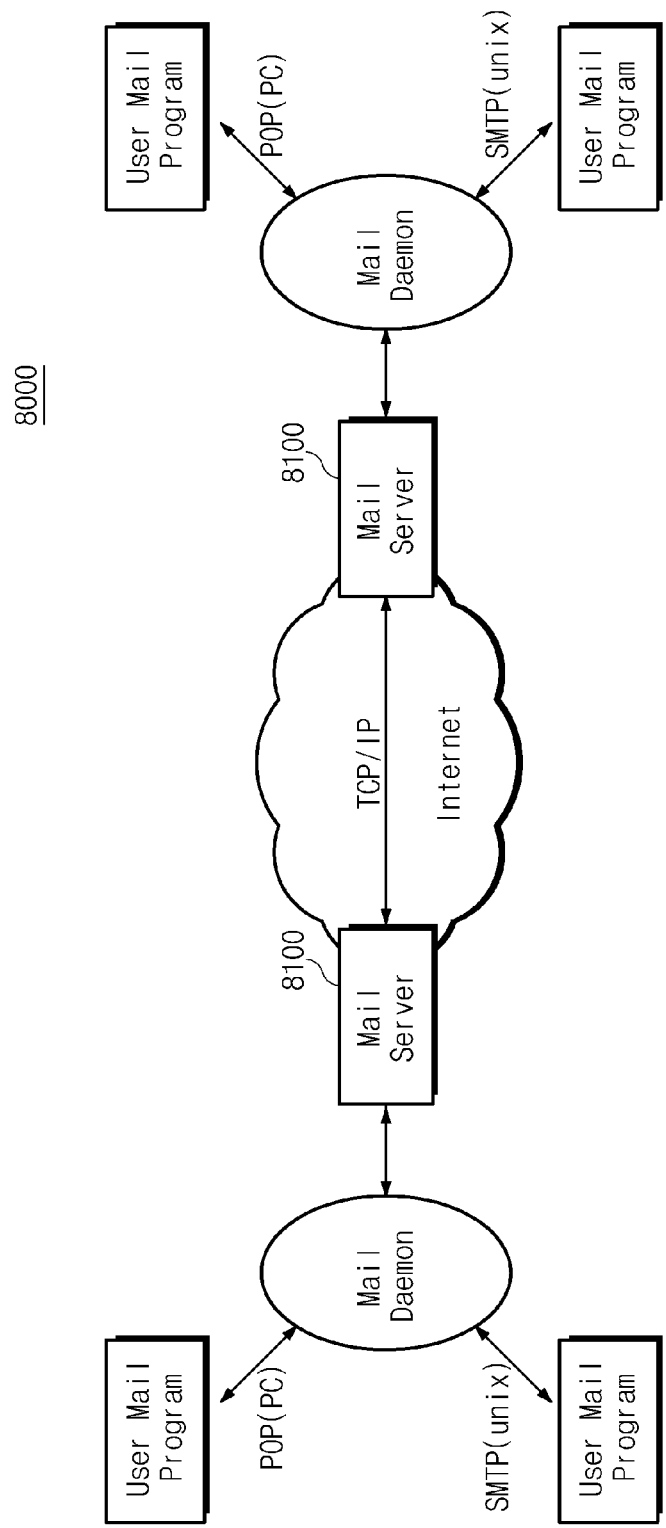
FIG. 17 is a diagram schematically illustrating systems to which a data storage device according to example embodiments of inventive concepts is applied.

FIG. 17 is a diagram schematically illustrating systems to which a data storage device according to example embodiments of inventive concepts is applied.

As illustrated in FIG. 17, a solid state drive including a data storage device according to an example embodiment of inventive concepts may be applied to a main server 8100.

Figure 18:
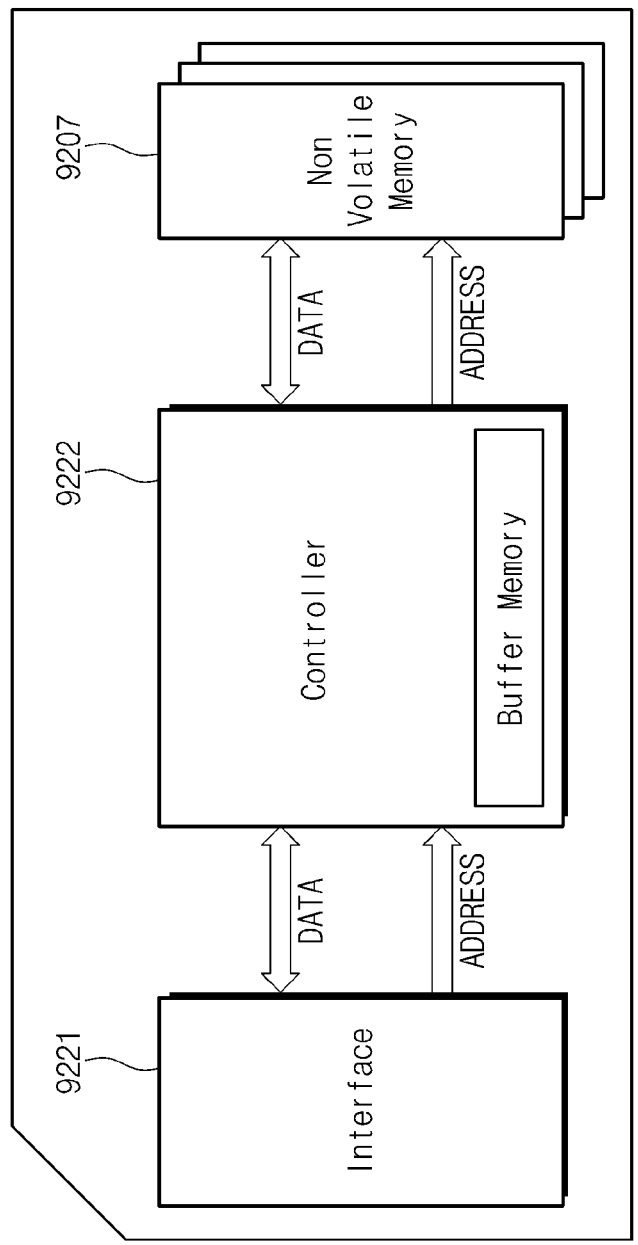
FIG. 18 is a block diagram schematically illustrating a memory card according to an example embodiment of inventive concepts.

FIG. 18 is a block diagram schematically illustrating a memory card according to an example embodiment of inventive concepts.

A memory card, for example, may be an MMC card, an SD card, a multiuse card, a micro-SD card, a memory stick, a compact SD card, an ID card, a PCMCIA card, an SSD card, a chip-card, a smartcard, an USB card, or the like.

Referring to FIG. 18, the memory card may include an interface circuit 9221 for interfacing with an external device, a controller 9222 including a buffer memory and controlling an operation of the memory card, and one or more nonvolatile memory devices 9207. The controller 9222 may be a processor which is configured to control write and read operations of the nonvolatile memory device 9207. The controller 9222 may be coupled with the nonvolatile memory device 9207 and the interface circuit 9221 via a data bus and an address bus.

The controller 9222 and the nonvolatile memory device 9207 may be configured substantially the same as that illustrated in FIG. 1. For example, it is possible to manage defragmentation fast and efficiently through division management of a logical address space. Also, it is possible to efficiently process an operation associated with defragmentation through a defragmentation command/LAB command.

Figure 19:
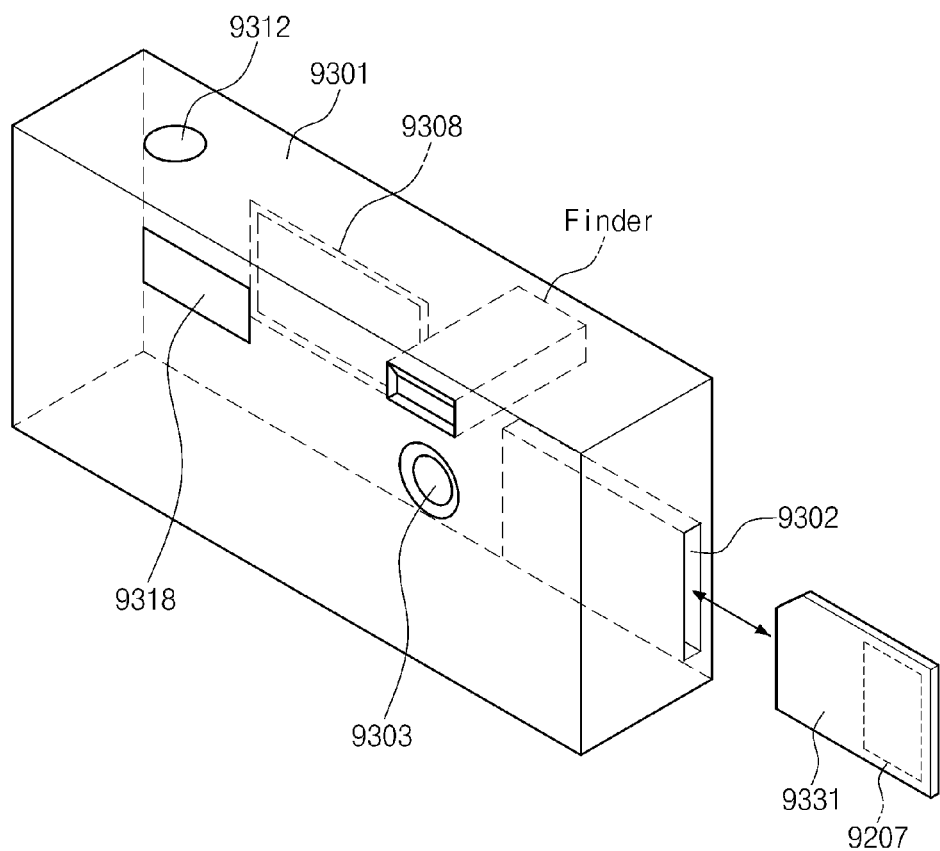
FIG. 19 is a block diagram schematically illustrating a digital still camera according to an example embodiment of inventive concepts.

FIG. 19 is a block diagram schematically illustrating a digital still camera according to an example embodiment of inventive concepts.

Referring to FIG. 19, a digital still camera may include a body 9301, a slot 9302, a lens 9303, a display circuit 9308, a shutter button 9312, a strobe 9318, and the like. In particular, a memory card 9331 may be inserted in the slot 9308, and the memory card 9331 may include a memory controller and a storage medium described in FIG. 1. For example, it is possible to manage defragmentation fast and efficiently through division management of a logical address space. Also, it is possible to efficiently process an operation associated with defragmentation through a defragmentation command/LAB command.

If the memory card 9331 has a contact type, an electric circuit on a circuit board may be electrically contacted with the memory card 9331 when it is inserted in the slot 9302. In the event that the memory card 9331 has a non-contact type, an electric circuit on a circuit board may communicate with the memory card 9331 in a radio-frequency manner.

Figure 20:
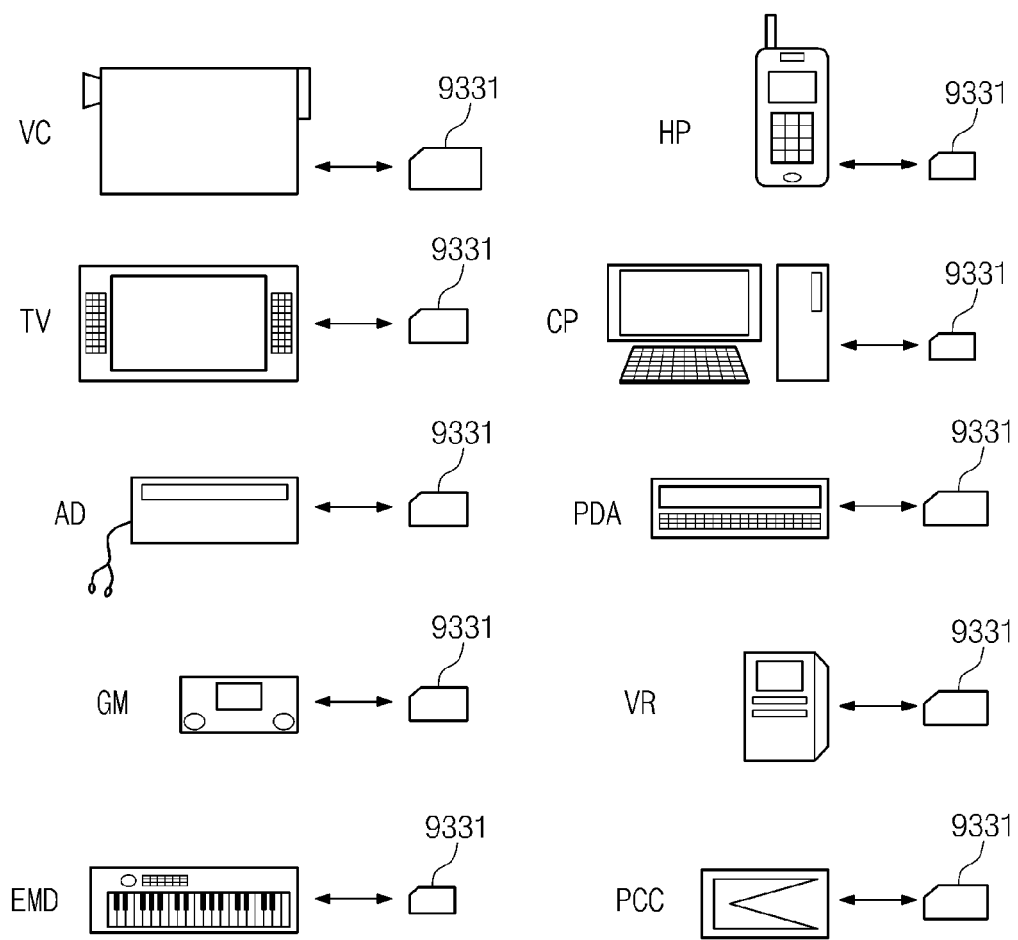
FIG. 20 is a diagram schematically illustrating various systems to which a memory card in FIG. 18 is applied.

FIG. 20 is a diagram schematically illustrating various systems to which a memory card in FIG. 18 is applied.

Referring to FIG. 20, a memory card 9331 may be applied to a video camera VC, a television TV, an audio device AD, a game machine GM, an electronic music device EMD, a cellular phone HP, a computer CP, a Personal Digital Assistant (PDA), a voice recorder VR, a PC card PCC, and the like.

In example embodiment, memory cells can be formed of a variable resistance memory cell. An exemplary variable resistance memory cell and a memory device including the same are disclosed in U.S. Pat. No. 7,529,124, the entirety of which is incorporated by reference herein.

In other example embodiments, memory cells can be formed of one of various cell structures having a charge storage layer. Cell structures having a charge storage layer include a charge trap flash structure using a charge trap layer, a stack flash structure in which arrays are stacked at multiple layers, a source-drain free flash structure, a pin-type flash structure, and the like.

In still other example embodiments, a memory device having a charge trap flash structure as a charge storage layer is disclosed in U.S. Pat. No. 6,858,906 and U.S. Patent Publication Nos. 2004/0169238 and 2006/0180851, the entirety of which is incorporated by reference herein. A source-drain free flash structure is disclosed in KR Patent No. 673020, the entirety of which is incorporated by reference herein.

A flash memory device and/or a memory controller according to example embodiments of inventive concepts may be packed using various types of packages. For example, A non-volatile memory device or a memory controller according to example embodiments of inventive concepts may be packed using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

While inventive concepts have been described with reference to example embodiments, it will be apparent to those skilled in the art that various changes and modifications may be made without departing from the spirit and scope of inventive concepts. Therefore, it should be understood that the above embodiments are not limiting, but illustrative.

What is claimed is:

1. A defragmentation method for a user device including a host and a nonvolatile storage device, the method comprising:
   determining whether fragments of a first file stored at the nonvolatile storage device are in a same logical address zone;
   determining, if the fragments of the first file are in different logical address zones, that usable space is available in at least one of the different logical address zones; and
   executing defragmentation of the fragments of the first file if the fragments of the first file are in the different logical address zones by moving the fragments of the first file to a logical address space corresponding to the at least one of the different logical address zones.

2. The defragmentation method of claim 1, further comprising:
   skipping defragmentation of the fragments of the first file when the fragments of the first file are in the same logical address zone.

3. The defragmentation method of claim 1, wherein the executing defragmentation of the fragments of the first file comprises:
   sending read and write commands for each of the fragments of the first file from the host to the nonvolatile storage device.

4. The defragmentation method of claim 1, wherein the executing defragmentation of the fragments of the first file comprises:
   sending a series of defrag commands from the host to the nonvolatile storage device.

5. The defragmentation method of claim 4, wherein each of the defrag commands uses a read/write command including defragmentation and end of defragmentation information.

6. The defragmentation method of claim 4, wherein the executing defragmentation further comprises:
   classifying the series of defrag commands according to logical address zone; and
   moving the fragments of the first file to logical address spaces corresponding to logical address zones based on the classified series of defrag commands.

7. The defragmentation method of claim 6, further comprising:
   setting a physical block storing invalid data generated during the executing of defragmentation on the fragments of the first file to an invalid block without additional information from the host.

8. The defragmentation method of claim 1, further comprising:
   determining whether rearrangement of fragments of the defragmented file is required after defragmentation on the fragments of the first file is completed; and
   rearranging the fragments of the defragmented file if rearrangement of the fragments of the defragmented file is required.

9. The defragmentation method of claim 8, wherein the rearranging the fragments of the defragmented file comprises:
   issuing, by the host to the nonvolatile storage device, an LBA (logical block address) command including source and destination addresses for fragments of the defragmented file to be rearranged; and
   changing mapping information of the defragmented file without physical movement of the fragments of the defragmented file.

10. A user device, comprising:
    a host including a defragmentation program; and
    a memory controller configured to control a storage medium in response to a request from the host;
    wherein a logical address space managed by the host is divided into a plurality of logical address zones, each of the plurality of logical address zones including logical addresses associated with physical addresses of the storage medium; and
    wherein the host is configured to skip defragmentation of a fragmented file stored at a same logical address zone and to perform logical defragmentation of a fragmented file stored at different logical address zones.

11. The user device of claim 10, wherein the host is configured to
- determine that usable space is available in at least one of the different logical address zones; and
- send read and write commands for each fragment of the fragmented file to the memory controller for defragmentation of the fragments of the fragmented file.

12. The user device of claim 10, wherein the host is configured to
- determine that usable space is available in at least one of the different logical address zones; and
- send a series of defrag commands to the memory controller for performing defragmentation of fragments of the fragmented file.

13. The user device of claim 12, wherein each of the defrag commands uses a read/write command including defragmentation and end of defragmentation information.

14. The user device of claim 13, wherein the memory controller is configured to classify the series of defrag commands according to logical address zone, and to move fragments of the fragmented file to logical address spaces corresponding to logical address zones based on the classified series of defrag commands.

15. The user device of claim 10, wherein the host is further configured to determine whether rearrangement of fragments of the defragmented file is required after defragmentation of the fragmented file is completed, and issue, to the memory controller, an LBA (logical block address) command including source and destination addresses for fragments to be rearranged if rearrangement of the fragments of the defragmented file is required, and wherein the memory controller is configured to rearrange the fragments of the defragmented file by changing mapping information of the defragmented file without physical movement of the fragments of the defragmented file.

16. A file defragmentation method for a user device including a host and a nonvolatile storage medium, the method comprising:
- selectively defragmenting, by the host, a fragmented file stored in the nonvolatile storage medium based on whether fragments of the fragmented file are associated with a same logical address zone in a logical address space corresponding to a physical address space of the nonvolatile storage medium, the logical address space including a plurality of logical address zones, and each of the plurality of logical address zones including a plurality of continuous logical addresses.

17. The method of claim 16, wherein the selectively defragmenting comprises:
- skipping defragmentation of the fragmented file if the fragments of the fragmented file are associated with the same logical address zone.

18. The method of claim 16, further comprising:
- determining that usable space is available in a logical address zone among the plurality of logical address zones; and
- wherein the selectively defragmenting includes
    - defragmenting the fragmented file by moving the fragments of the fragmented file such that the fragments of the fragmented file are associated with only the logical address zone among the plurality of logical address zones.

19. The method of claim 16, wherein the selectively defragmenting comprises:
- defragmenting the fragmented file only if the fragments of fragmented file are associated with different logical address zones.

20. The method of claim 16, wherein fragments of the defragmented file are associated with the same logical address zone, and wherein the method further includes,
- rearranging the fragments of the defragmented file by changing mapping information of the defragmented file without physical movement of the fragments of the defragmented file in the physical address space of the nonvolatile storage medium.

* * * * *